United States Patent
Bakalash et al.

(10) Patent No.: US 6,434,544 B1
(45) Date of Patent: Aug. 13, 2002

(54) STAND-ALONE CARTRIDGE-STYLE DATA AGGREGATION SERVER PROVIDING DATA AGGREGATION FOR OLAP ANALYSES

(75) Inventors: Reuven Bakalash, Shdema; Guy Shaked, Beer Sheva; Joseph Caspi, Herzlyia, all of (IL)

(73) Assignee: Hyperroll, Israel Ltd., Rehovot (IL)

( * ) Notice: Subject to any disclaimer, the term of this patent is extended or adjusted under 35 U.S.C. 154(b) by 0 days.

(21) Appl. No.: 09/514,611

(22) Filed: Feb. 28, 2000

Related U.S. Application Data

(63) Continuation-in-part of application No. 09/368,241, filed on Aug. 4, 1999.

(51) Int. Cl.$^7$ .............................................. G06F 17/30
(52) U.S. Cl. ................................. 707/2; 707/3; 707/10; 707/102
(58) Field of Search ............................. 707/1–5, 8, 7, 707/10, 102

(56) References Cited

U.S. PATENT DOCUMENTS

| | | | | |
|---|---|---|---|---|
| 5,794,246 A | * | 8/1998 | Sankaran et al. | 707/101 |
| 5,805,885 A | * | 9/1998 | Leach et al. | 709/316 |
| 5,822,751 A | * | 10/1998 | Gray et al. | 707/3 |
| 6,064,999 A | * | 5/2000 | Dalal | 707/2 |
| 6,115,705 A | * | 9/2000 | Larson | 707/3 |
| 6,151,601 A | * | 11/2000 | Papierniak et al. | 707/10 |
| 6,161,103 A | * | 12/2000 | Rauer et al. | 707/4 |
| 6,173,310 B1 | * | 1/2001 | Yost et al. | 709/201 |
| 6,182,061 B1 | * | 1/2001 | Matsuzawa et al. | 707/2 |
| 6,208,975 B1 | * | 3/2001 | Bull et al. | 705/14 |
| 6,212,515 B1 | * | 4/2001 | Rogers | 707/2 |

OTHER PUBLICATIONS

Albrecht et al., "Aggregate–Based Query Processing in a Parallel Data Warehouse Server", Proceedings of the 10th International Workshop on Database and Expert Systems Applications, Sep. 1–3 1999, pp. 40–44.*

Harinarayan et al. "Implementing Data Cubes Efficiently", Proceedings of the 1996 SIGMOD International Conference on Management of Data, Jun. 4–6, 1996, pp. 205–216.*

\* cited by examiner

*Primary Examiner*—Jean R. Homere
*Assistant Examiner*—Luke S Wassum
(74) *Attorney, Agent, or Firm*—Thomas J. Ferkowski, Esq., P.C.

(57) ABSTRACT

An improved method of and apparatus for aggregating data elements in multidimensional databases (MDDB) realized in the form of a high-performance stand-alone (i.e. external) aggregation server which can be plugged-into conventional OLAP systems to achieve significant improvements in system performance. In accordance with the principals of the present invention, the stand-alone aggregation server contains a scalable MDDB and a high-performance aggregation engine that are integrated into the modular architecture of the aggregation server. The stand-alone aggregation server of the present invention can uniformly distributed data elements among a plurality of processors, for balanced loading and processing, and therefore is highly scalable. The stand-alone aggregation server of the present invention can be used to realize (i) an improved MDDB for supporting on-line analytical processing (OLAP) operations, (ii) an improved Internet URL Directory for supporting on-line information searching operations by Web-enabled client machines, as well as (iii) diverse types of MDDB-based systems for supporting real-time control of processes in response to complex states of information reflected in the MDDB.

18 Claims, 28 Drawing Sheets

Page Allocation Table pointing on physical records of a multidimensional variable (e.g. the two first rows of a variable of FIG. 2B reside in page # 0)

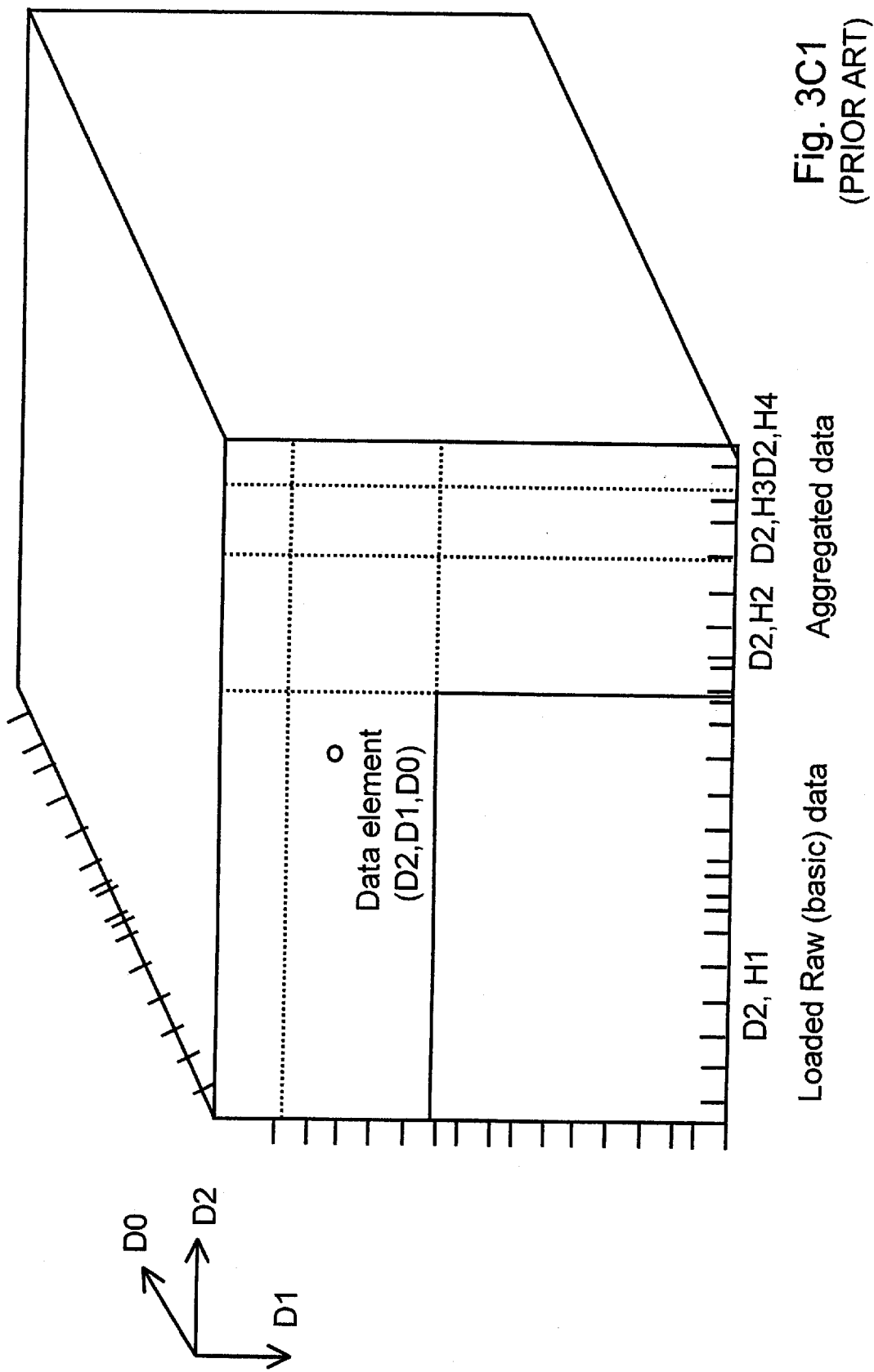
Fig. 3C1 (PRIOR ART)

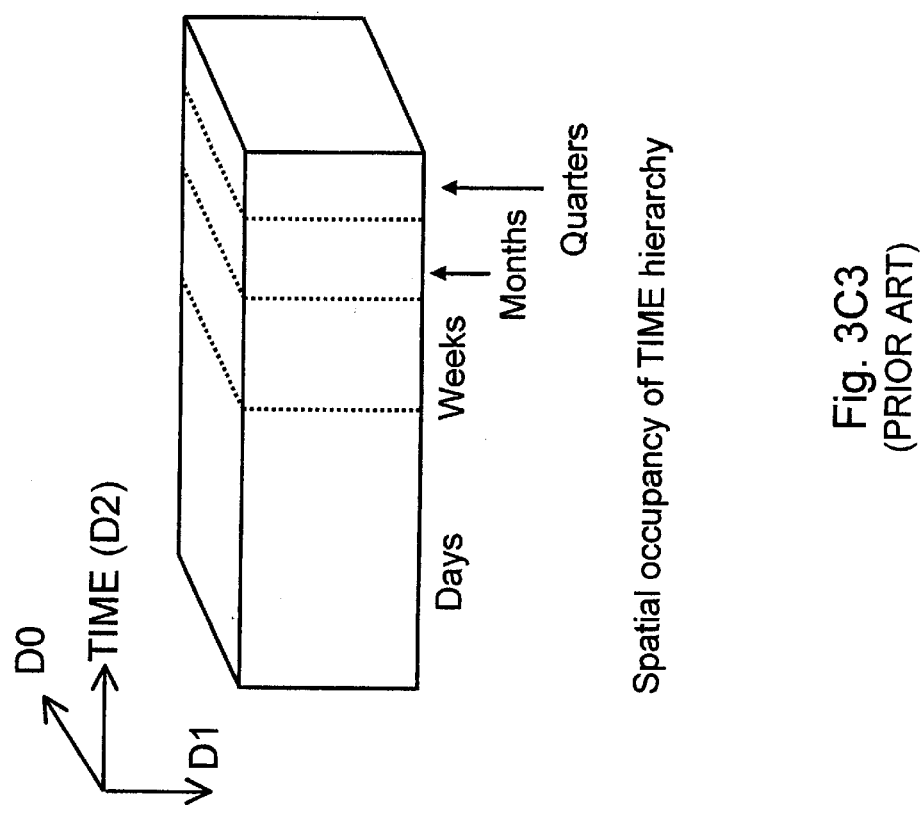
Fig. 3C3
(PRIOR ART)
Spatial occupancy of TIME hierarchy
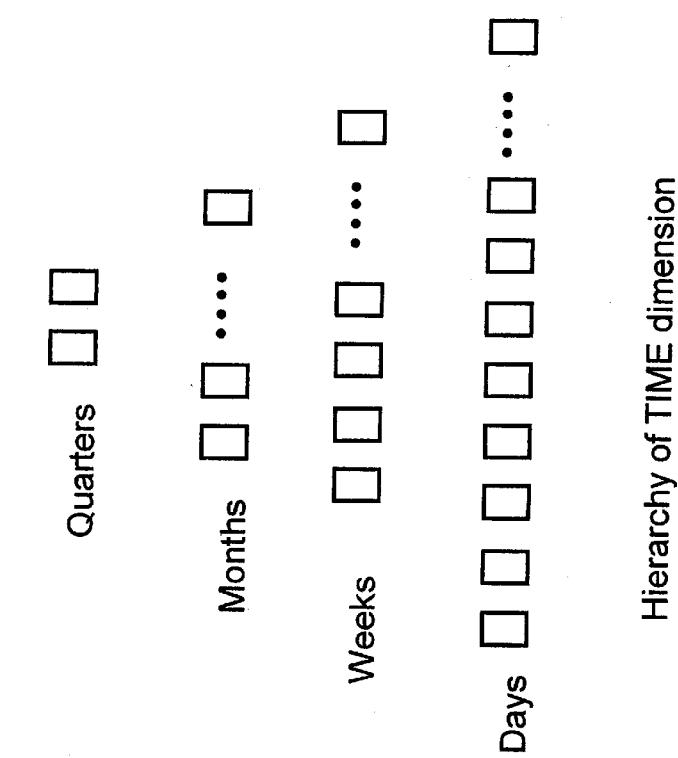
Fig. 3C2
(PRIOR ART)
Hierarchy of TIME dimension

|  | NBR. OF DIM. | NBR. OF ATOMIC DATA DATA VALUES | LEAF NODE DENSITY % | NUMBER OF VALUES IN CUBE AFTER ROLL-UP | ORACLE EXPRESS V. 6.2 | IMPLEMENTATION OF CURRENT INVENTION |
|---|---|---|---|---|---|---|
| D1 | 6 | 302M | 9 | 427 M | 16 h | 15 m |
| D2 | 4 | 414M | 1.27 | 969 M | 50 m | 5 m |
| D3 | 5 | 14,499M | 0.03 | 63,954 M | 31 h | 1h 23 m |
| D4 | 6 | 623,494M | 8 * 10⁻⁴ | 7,930 G | EXCEEDS 48 h | 2 h 20 m |
| D5 | 6 | 243,000M | 10⁻⁸ | 1,160,000 G | 22 h | 4 m |
| D6 | 4 | 7M | DEFINED AS 100 | 19 M | 15 m | 1 m |

FIG. 8A

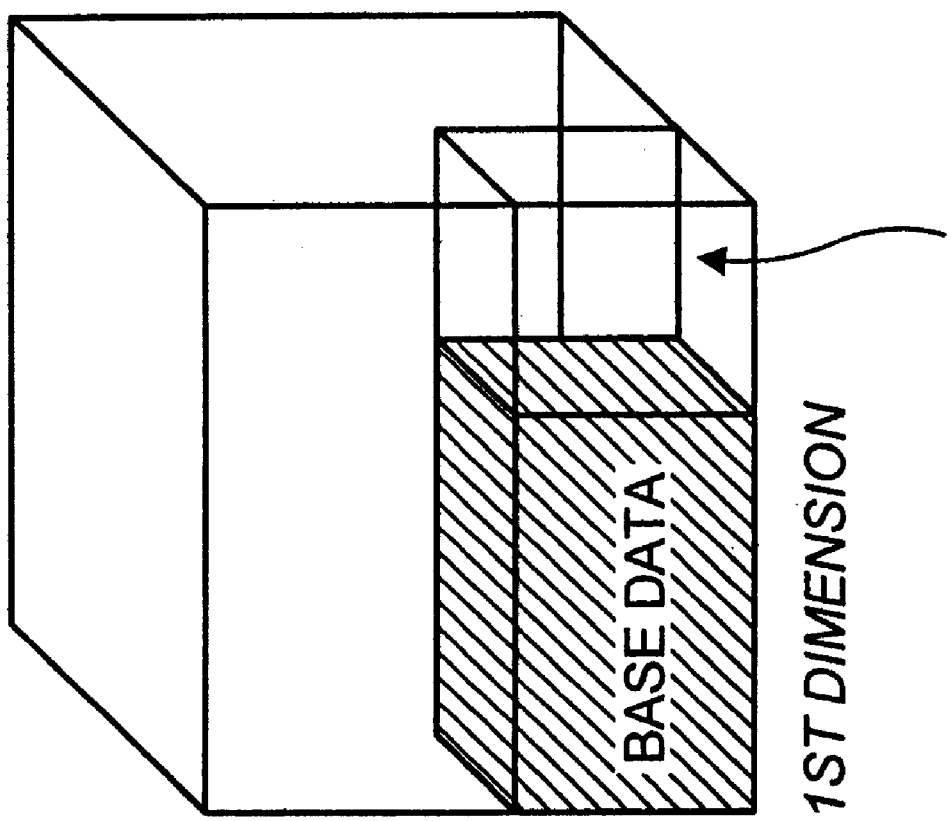

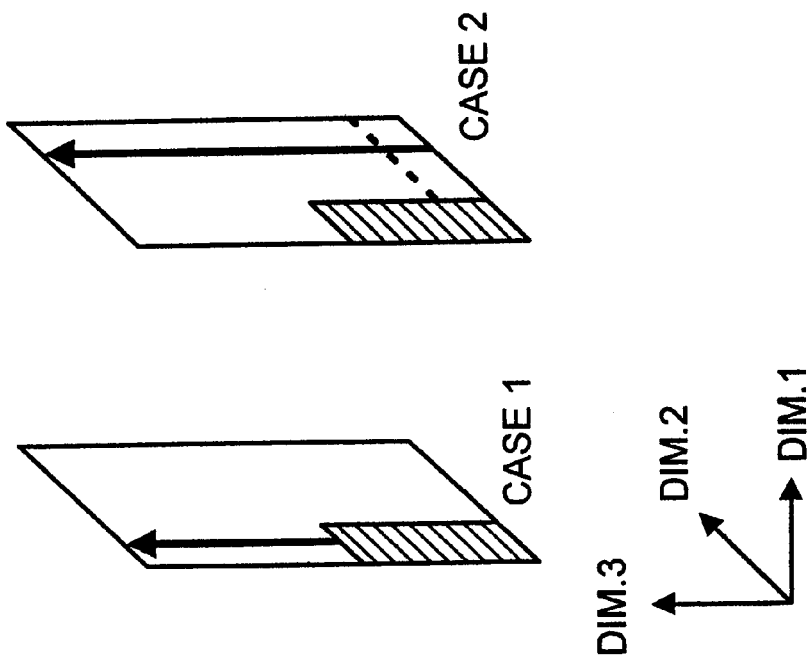
A. DIRECTED AGGREGATION IN DIMENSION 3, CASES 1 AND 2
FIG. 9C2
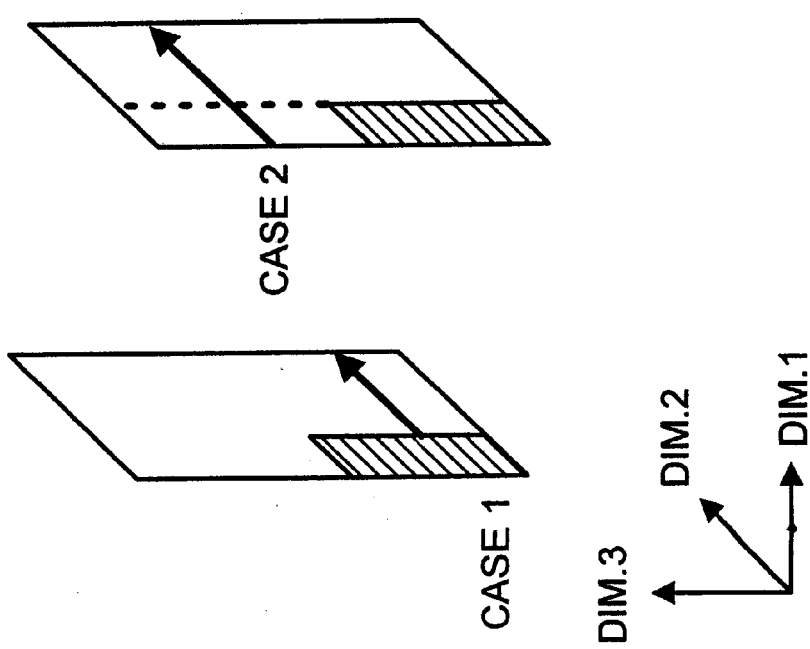
A. DIRECTED AGGREGATION IN DIMENSION 2, CASES 1 AND 2
FIG. 9C1

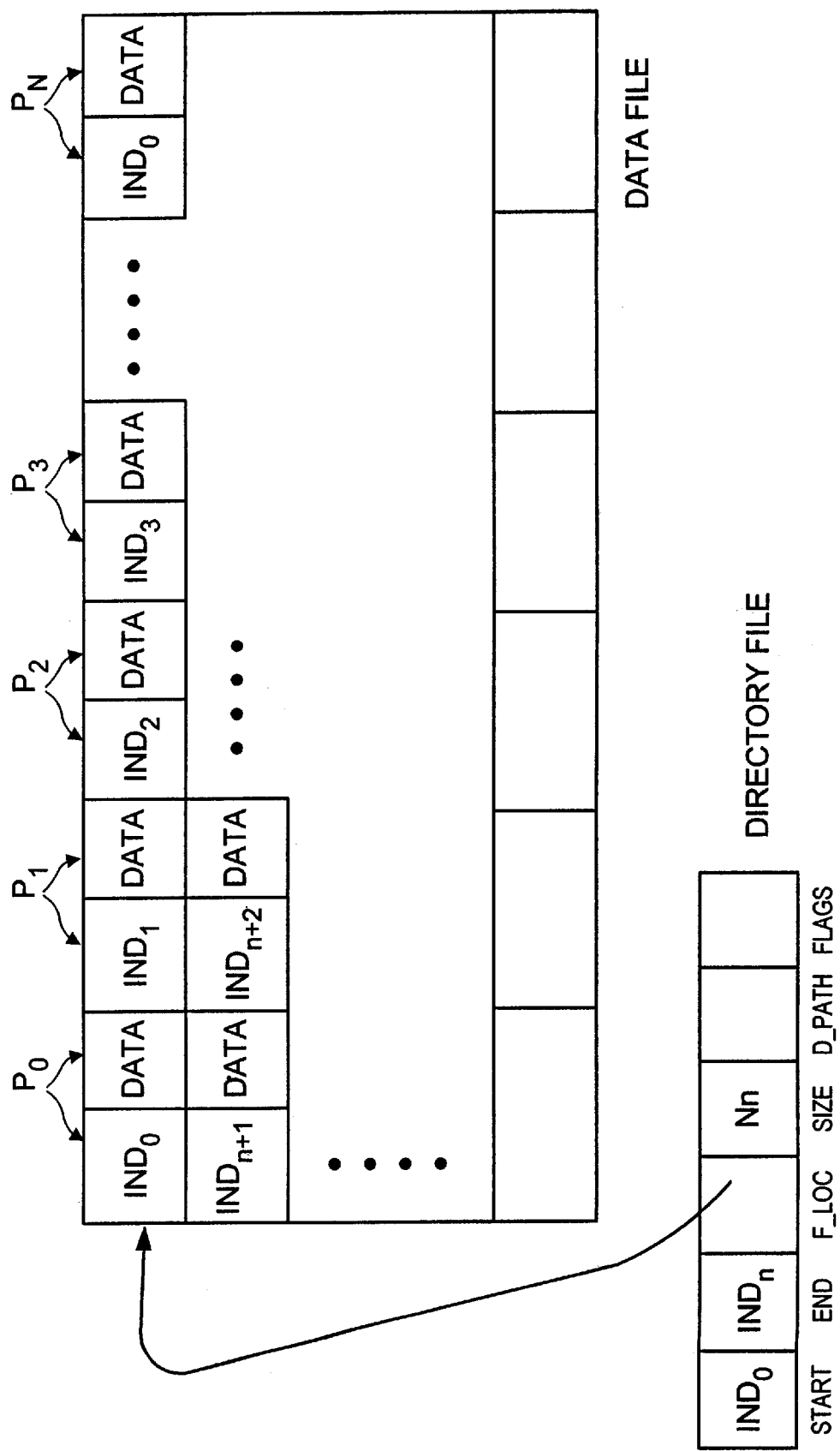
F I G. 10B

STRUCT. 3

STRUCT. 2

STRUCT. 1

STAND-ALONE CARTRIDGE-STYLE DATA AGGREGATION SERVER PROVIDING DATA AGGREGATION FOR OLAP ANALYSES

RELATED CASE

This is a Continuation-in-part of: copending application Ser. No. 09/368,241 entitled "Method Of And System For Managing Multi-Dimensional Databases Using Modular-Arithmetic Based Address Data Mapping Processes" filed Aug. 4, 1999; said Application being commonly owned by HyperRoll, Limited, and incorporated herein by reference in its entirety.

BACKGROUND OF THE INVENTION

1. Field of Invention

The present invention relates to a method of and system for aggregating data elements in a multi-dimensional database (MDDB) supported upon a computing platform and also to provide an improved method of and system for managing data elements within a MDDB during on-line analytical processing (OLAP) operations.

2. Brief Description of the State of the Art

The ability to act quickly and decisively in today's increasingly competitive marketplace is critical to the success of organizations. The volume of information that is available to corporations is rapidly increasing and frequently overwhelming. Those organizations that will effectively and efficiently manage these tremendous volumes of data, and use the information to make business decisions, will realize a significant competitive advantage in the marketplace.

Data warehousing, the creation of an enterprise-wide data store, is the first step towards managing these volumes of data. The Data Warehouse is becoming an integral part of many information delivery systems because it provides a single, central location where a reconciled version of data extracted from a wide variety of operational systems is stored. Over the last few years, improvements in price, performance, scalability, and robustness of open computing systems have made data warehousing a central component of Information Technology CIT strategies. Details on methods of data integration and constructing data warehouses can be found in the white paper entitled "Data Integration: The Warehouse Foundation" by Louis Rolleigh and Joe Thomas, published at http:/www.acxiom.com.whitepapers/wp-11.asp.

Building a Data Warehouse has its own special challenges (e.g. using common data model, common business dictionary, etc.) and is a complex endeavor. However, just having a Data Warehouse does not provide organizations with the often-heralded business benefits of data warehousing. To complete the supply chain from transactional systems to decision maker, organizations need to deliver systems that allow knowledge workers to make strategic and tactical decisions based on the information stored in these warehouses. These decision support systems are referred to as On-Line Analytical Processing (OLAP) systems. OLAP systems allow knowledge workers to intuitively, quickly, and flexibly manipulate operational data using familiar business terms, in order to provide analytical insight into a particular problem or line of inquiry. For example, by using an OLAP system, decision makers can "slice and dice" information along a customer (or business) dimension, and view business metrics by product and through time. Reports can be defined from multiple perspectives that provide a high-level or detailed view of the performance of any aspect of the business. Decision makers can navigate throughout their database by drilling down on a report to view elements at finer levels of detail, or by pivoting to view reports from different perspectives. To enable such full-functioned business analyses, OLAP systems need to (1) support sophisticated analyses, (2) scale to large numbers of dimensions, and (3) support analyses against large atomic data sets. These three key requirements are discussed further below. Decision makers use key performance metrics to evaluate the operations within their domain, and OLAP systems need to be capable of delivering these metrics in a user-customizable format. These metrics may be obtained from the transactional databases precalculated and stored in the database, or generated on demand during the query process. Commonly used metrics include:

(1) Multidimensional Ratios (e.g. Percent to Total) "Show me the contribution to weekly sales and category profit made by all items sold in the Northwest stores between July 1 and July 14."

(2) Comparisons (e.g. Actual vs. Plan, This Period vs. Last Period) "Show me the sales to plan percentage variation for this year and compare it to that of the previous year to identify planning discrepancies."

(3) Ranking and Statistical Profiles (e.g. Top N/Bottom N, 70/30, Quartiles) "Show me sales, profit and average call volume per day for my 20 most profitable salespeople, who are in the top 30% of the worldwide sales."

(4) Custom Consolidations "Show me an abbreviated income statement by quarter for the last two quarters for my Western Region operations."

Knowledge workers analyze data from a number of different business perspectives or dimensions. As used hereinafter, a dimension is any element or hierarchical combination of elements in a data model that can be displayed orthogonally with respect to other combinations of elements in the data model. For example, if a report lists sales by week, promotion, store, and department, then the report would be a slice of data taken from a four-dimensional data model.

Target marketing and market segmentation applications involve extracting highly qualified result sets from large volumes of data. For example, a direct marketing organization might want to generate a targeted mailing list based on dozens of characteristics, including purchase frequency, size of the last purchase, past buying trends, customer location, age of customer, and gender of customer. These applications rapidly increase the dimensionality requirements for analysis.

The number of dimensions in OLAP systems range from a few orthogonal dimensions to hundreds of orthogonal dimensions. Orthogonal dimensions in an exemplary OLAP application might include Geography, Time, and Products.

Atomic data refers to the lowest level of data granularity required for effective decision making. In the case of a retail merchandising manager, "atomic data" may refer to information by store, by day, and by item. For a banker, atomic data may be information by account, by transaction, and by branch. Most organizations implementing OLAP systems find themselves needing systems that can scale to tens, hundreds, and even thousands of gigabytes of atomic information.

As OLAP systems become more pervasive and are used by the majority of the enterprise, more data over longer time frames will be included in the data store (i.e. data warehouse), and the size of the database will increase by at least an order of magnitude. Thus, OLAP systems need to be able to scale from present to near-future volumes of data.

In general, OLAP systems need to (1) support the complex analysis requirements of decision-makers, (2) analyze the data from a number of different perspectives (i.e. business dimensions), and (3) support complex analyses against large input (atomic-level) data sets from a Data Warehouse maintained by the organization using a relational database management system (RDBMS).

Vendors of OLAP systems classify OLAP Systems as either Relational OLAP (ROLAP) or Multidimensional OLAP (MOLAP) based on the underlying architecture thereof. Thus, there are two basic architectures for On-Line Analytical Processing systems: The ROLAP Architecture, and the MOLAP architecture.

Overview of The Relational OLAP (ROLAP) System Architecture

The Relational OLAP (ROLAP) system accesses data stored in a Data Warehouse to provide OLAP analyses. The premise of ROLAP is that OLAP capabilities are best provided directly against the relational database, i.e. the Data Warehouse.

The ROLAP architecture was invented to enable direct access of data from Data Warehouses, and therefore support optimization techniques to meet batch window requirements and provide fast response times. Typically, these optimization techniques include application-level table partitioning, pre-aggregate inferencing, denormalization support, and the joining of multiple fact tables.

As shown in FIG. 1A, a typical prior art ROLAP system has a three-tier or layer client/server architecture. The "database layer" utilizes relational databases for data storage, access, and retrieval processes. The "application logic layer" is the ROLAP engine which executes the multidimensional reports from multiple users. The ROLAP engine integrates with a variety of "presentation layers," through which users perform OLAP analyses.

After the data model for the data warehouse is defined, data from on-line transaction-processing (OLTP) systems is loaded into the relational database management system (RDBMS). If required by the data model, database routines are run to pre-aggregate the data within the RDBMS. Indices are then created to optimize query access times. End users submit multidimensional analyses to the ROLAP engine, which then dynamically transforms the requests into SQL execution plans. The SQL execution plans are submitted to the relational database for processing, the relational query results are cross-tabulated, and a multidimensional result data set is returned to the end user. ROLAP is a fully dynamic architecture capable of utilizing precalculated results when they are available, or dynamically generating results from atomic information when necessary.

Overview of MOLAP System Architecture

Multidimensional OLAP (MOLAP) systems utilize a proprietary multidimensional database (MDDB) to provide OLAP analyses. The main premise of this architecture is that data must be stored multidimensionally to be accessed and viewed multidimensionally.

As shown in FIG. 1B, prior art MOLAP systems have an Aggregation, Access and Retrieval module which is responsible for all data storage, access, and retrieval processes, including data aggregation (i.e. preaggregation) in the MDDB. As shown in FIG. 1B, the base data loader is fed with base data, in the most detailed level, from the Data Warehouse, into the Multi-Dimensional Data Base (MDDB). On top of the base data, layers of aggregated data are built-up by the Aggregation program, which is part of the Aggregation, Access and Retrieval module. As indicated in this figure, the application logic module is responsible for the execution of all OLAP requests/queries (e.g. ratios, ranks, forecasts, exception scanning, and slicing and dicing) of data within the MDDB. The presentation module integrates with the application logic module and provides an interface, through which the end users view and request OLAP analyses on their client machines which may be web-enabled through the infrastructure of the Internet. The client/server architecture of a MOLAP system allows multiple users to access the same multidimensional database (MDDB).

Information (i.e. basic data) from a variety of operational systems within an enterprise, comprising the Data Warehouse, is loaded into a prior art multidimensional database (MDDB) through a series of batch routines. The Express™ server by the Oracle Corporation is exemplary of a popular server which can be used to carry out the data loading process in prior art MOLAP systems. As shown in FIG. 2B an exemplary 3-D MDDB is schematically depicted, showing geography, time and products as the "dimensions" of the database. The multidimensional data of the MDDB is organized in an array structure, as shown in FIG. 2C. Physically, the Express™ server stores data in pages (or records) of an information file. Pages contain 512, or 2048, or 4096 bytes of data, depending on the platform and release of the Express™ server. In order to look up the physical record address from the database file recorded on a disk or other mass storage device, the Express™ server generates a data structure referred to as a "Page Allocation Table (PAT)". As shown in FIG. 2D, the PAT tells the Express™ server the physical record number that contains the page of data. Typically, the PAT is organized in pages. The simplest way to access a data element in the MDDB is by calculating the "offset" using the additions and multiplications expressed by a simple formula:

$$\text{Offset}=\text{Months}+\text{Product}*(\text{\# of\_Months})+\text{City}*(\text{\# of\_Months}*\text{\# of\_Products})$$

During an OLAP session, the response time of a multidimensional query on a prior art MDDB depends on how many cells in the MDDB have to be added "on the fly". As the number of dimensions in the MDDB increases linearly, the number of the cells in the MDDB increases exponentially. However, it is known that the majority of multidimensional queries deal with summarized high level data. Thus, as shown in FIGS. 3A and 3B, once the atomic data (i.e. "basic data") has been loaded into the MDDB, the general approach is to perform a series of calculations in batch in order to aggregate (i.e. pre-aggregate) the data elements along the orthogonal dimensions of the MDDB and fill the array structures thereof. For example, revenue figures for all retail stores in a particular state (i.e. New York) would be added together to fill the state level cells in the MDDB. After the array structure in the database has been filled, integer-based indices are created and hashing algorithms are used to improve query access times. Pre-aggregation of dimension D0 is always performed along the cross-section of the MDDB along the D0 dimension.

As shown in FIG. 3C2, the primarily loaded data in the MDDB is organized at its lowest dimensional hierarchy. As shown in FIGS. 3C1 and 3C3, the results of the pre-aggregations are stored in the neighboring parts of the MDDB.

As shown in FIG. 3C2, along the TIME dimension, weeks are the aggregation results of days, months are the aggregation results of weeks, and quarters are the aggregation results of inontlis. While not shown in the figures, along the GEOGRAPHY dimension, states are the aggregation results of cities, countries are the aggregation results of states, and continents are the aggregation results of countries. By pre-aggregating (i.e. consolidating or compiling) all logical subtotals and totals along all dimensions of the MDDB, it is possible to carry out real-time MOLAP operations using a multidimensional database (MDDB) containing both basic (i.e. atomic) and pre-aggregated data. Once this compilation process has been completed, the MDDB is ready for use. Users request OLAP reports by submitting queries through the OLAP Application interface (e.g. using web-enabled client machines), and the application logic layer responds to the submitted queries by retrieving the stored data from the MDDB for display on the client machine.

Typically, in MDDB systems, the aggregated data is very sparse, tending to explode as the number of dimension grows and dramatically slowing down the retrieval process (as described in the report entitled "Database Explosion: The OLAP Report", htt://www.olapreport.com/DatabaseExplosion.htm, incorporated herein by reference). Quick and on line retrieval of queried data is critical in delivering on-line response for OLAP queries. Therefore, the data structure of the MDDB, and methods of its storing, indexing and handling are dictated mainly by the need of fast retrieval of massive and sparse data.

Different solutions for this problem are disclosed in the following U.S. Patents, each of which is incorporated herein by reference in its entirety:

U.S. Pat. No. 5,822,751 "Efficient Multidimensional Data Aggregation Operator Implementation"

U.S. Pat. No. 5,805,885 "Method And System For Aggregation Objects"

U.S. Pat. No. 5,781,896 "Method And System For Efficiently Performing Database Table Aggregation Using An Aggregation Index"

U.S. Pat. No. 5,745,764 "Method And System For Aggregation Objects"

In all the prior art OLAP servers, the process of storing, indexing and handling MDDB utilize complex data structures to largely improve the retrieval speed, as part of the querying process, at the cost of slowing down the storing and aggregation. The query-bounded structure, that must support fast retrieval of queries in a restricting environment of high sparcity and multi-hierarchies, is not the optimal one for fast aggregation.

In addition to the aggregation process, the Aggregation, Access and Retrieval module is responsible for all data storage, retrieval and access processes. The Logic module is responsible for the execution of OLAP queries. The Presentation module intermediates between the user and the logic module and provides an interface through which the end users view and request OLAP analyses. The client/server architecture allows multiple users to simultaneously access the multidimensional database.

In summary, general system requirements of OLAP systems include: (1) supporting sophisticated analysis, (2) scaling to large number of dimensions, and (3) supporting analysis against large atomic data sets.

MOLAP system architecture is capable of providing analytically sophisticated reports and analysis functionality. However, requirements (2) and (3) fundamentally limit MOLAP's capability, because to be effective and to meet end-user requirements, MOLAP databases need a high degree of aggregation.

By contrast, the ROLAP system architecture allows the construction of systems requiring a low degree of aggregation, but such systems are significantly slower than systems based on MOLAP system architecture principles.

The resulting long aggregation times of ROLAP systems impose severe limitations on its volumes and dimensional capabilities.

The graphs plotted in FIG. 5 clearly indicate the computational demands that are created when searching an MDDB during an OLAP session, where answers to queries are presented to the MOLAP system, and answers thereto are solicited often under real-time constraints. However, prior art MOLAP systems have limited capabilities to dynamically create data aggregations or to calculate business metrics that have not been precalculated and stored in the MDDB.

The large volumes of data and the high dimensionality of certain market segmentation applications are orders of magnitude beyond the limits of current multidimensional databases.

ROLAP is capable of higher data volumes. However, the ROLAP architecture, despite its high volume and dimensionality superiority, suffers from several significant drawbacks as compared to MOLAP:

Full aggregation of large data volumes are very time consuming, otherwise, partial aggregation severely degrades the query response.

It has a slower query response

It requires developers and end users to know SQL

SQL is less capable of the sophisticated analytical functionality necessary for OLAP ROLAP provides limited application functionality Thus, improved techniques for data aggregation within MOLAP systems would appear to allow the number of dimensions of and the size of atomic (i.e. basic) data sets in the MDDB to be significantly increased, and thus increase the usage of the MOLAP system architecture.

Also, improved techniques for data aggregation within ROLAP systems would appear to allow for maximized query performance on large data volumes, and reduce the time of partial aggregations that degrades query response, and thus generally benefit ROLAP system architectures.

Thus, there is a great need in the art for an improved way of and means for aggregating data elements within a multidimensional database (MDDB), while avoiding the shortcomings and drawbacks of prior art systems and methodologies.

SUMMARY AND OBJECTS OF PRESENT INVENTION

Accordingly, it is a further object of the present invention to provide an improved method of and system for managing data elements within a multidimensional database (MDDB) using a novel stand-alone (i.e. external) data aggregation server, achieving a significant increase in system performance (e.g. deceased access/search time) using a stand-alone scalable data aggregation server.

Another object of the present invention is to provide such system, wherein the stand-alone aggregation server includes an aggregation engine that is integrated with an MDDB, to provide a cartridge-style plug-in accelerator which can communicate with virtually any conventional OLAP server.

Another object of the present invention is to provide such a stand-alone data aggregation server whose computational tasks are restricted to data aggregation, leaving all other OLAP functions to the MOLAP server and therefore complementing OLAP server's functionality.

Another object of the present invention is to provide such a system, wherein the stand-alone aggregation server carries out an improved method of data aggregation within the MDDB which enables the dimensions of the MDDB to be scaled up to large numbers and large atomic (i.e. base) data sets to be handled within the MDDB.

Another object of the present invention is to provide such a stand-alone aggregation server, wherein the aggregation engine supports high-performance aggregation (i.e. data roll-up) processes to maximize query performance of large data volumes, and to reduce the time of partial aggregations that degrades the query response.

Another object of the present invention is to provide such a stand-alone, external scalable aggregation server, wherein its integrated data aggregation (i.e. roll-up) engine speeds up the aggregation process by orders of magnitude, enabling larger database analysis by lowering the aggregation times.

Another object of the present invention is to provide such a novel stand-alone scalable aggregation server for use in OLAP operations, wherein the scalability of the aggregation server enables (i) the speed of the aggregation process carried out therewithin to be substantially increased by distributing the computationally intensive tasks associated with data aggregation among multiple processors, and (ii) the large data sets contained within the MDDB of the aggregation server to be subdivided among multiple processors thus allowing the size of atomic (i.e. basic) data sets within the MDDB to be substantially increased.

Another object of the present invention is to provide such a novel stand-alone scalable aggregation server, which provides for uniform load balancing among processors for high efficiency and best performance, and linear scalability for extending the limits by adding processors.

Another object of the present invention is to provide a stand-alone, external scalable aggregation server, which is suitable for MOLAP as well as for ROLAP system architectures.

Another object of the present invention is to provide a novel stand-alone scalable aggregation server, wherein an MDDB and aggregation engine are integrated and the aggregation engine carries out a high-performance aggregation algorithm and novel storing and searching methods within the MDDB.

Another object of the present invention is to provide a novel stand-alone scalable aggregation server which can be supported on single-processor (i.e. sequential or serial) computing platforms, as well as on multi-processor (i.e. parallel) computing platforms.

Another object of the present invention is to provide a novel stand-alone scalable aggregation server which can be used as a complementary aggregation plug-in to existing MOLAP and ROLAP databases.

Another object of the present invention is to provide a novel stand-alone scalable aggregation server which carries out an novel rollup (i.e. down-up) and spread down (i.e. top-down) aggregation algorithms.

Another object of the present invention is to provide a novel stand-alone scalable aggregation server which includes an integrated MDDB and aggregation engine which carries out full pre-aggregation and/or "on-the-fly" aggregation processes within the MDDB.

Another object of the present invention is to provide such a novel stand-alone scalable aggregation server which is capable of supporting MDDB having a multi-hierarchy dimensionality.

Another object of the present invention is to provide a novel method of aggregating multidimensional data of atomic data sets originating from a RDBMS Data Warehouse.

Another object of the present invention is to provide a novel method of aggregating multidimensional data of atomic data sets originating from other sources, such as external ASCII files, MOLAP server, or other end user applications.

Another object of the present invention is to provide a novel stand-alone scalable data aggregation server which can communicate with any MOLAP server via standard ODBC, OLE DB or DLL interface, in a completely transparent manner with respect to the (client) user, without any time delays in queries, equivalent to storage in MOLAP server's cache.

Another object of the present invention is to provide a novel "cartridge-style" (stand-alone) scalable data aggregation engine which dramatically expands the boundaries of MOLAP into large-scale applications including Banking, Insurance, Retail and Promotion Analysis.

Another object of the present invention is to provide a novel "cartridge-style" (stand-alone) scalable data aggregation engine which dramatically expands the boundaries of high-volatility type ROLAP applications such as, for example, the precalculation of data to maximize query performance.

Another object of the present invention is to provide a generic plug-in cartridge-type data aggregation component, suitable for all MOLAP systems of different vendors, dramatically reducing their aggregation burdens.

Another object of the present invention is to provide a novel high performance cartridge-type data aggregration server which, having standardized interfaces, can be plugged-into the OLAP system of virtually any user or vendor.

Another object of the present invention is to provide a novel "cartridge-style" (stand-alone) scalable data aggregation engine which has the capacity to convert long batch-type data aggregations into interactive sessions.

These and other object of the present invention will become apparent hereinafter and in the claims to Invention set forth herein.

BRIEF DESCRIPTION OF THE DRAWINGS

In order to more fully appreciate the objects of the present invention, the following Detailed Description of the Illustrative Embodiments should be read in conjunction with the accompanying Drawings, wherein:

FIG. 3C1 is a schematic representation of an exemplary three-dimensional database used in a conventional MOLAP system of the prior art, showing that each data element contained therein is physically stored at a location in the recording media of the system which is specified by the dimensions (and subdimensions within the dimensional hierarchy) of the data variables which are assigned integer-based coordinates in the MDDB, and also that data elements associated with the basic data loaded into the MDDB are assigned lower integer coordinates in MDDB Space than pre-aggregated data elements contained therewithin;

FIG. 3C2 is a schematic representation illustrating that a conventional hierarchy of the dimension of "time" typically contains the subdimensions "days, weeks, months, quarters, etc." of the prior art;

FIG. 3C3 is a schematic representation showing how data elements having higher subdimensions of time in the MDDB of the prior art are typically assigned increased integer addresses along the time dimension thereof;

FIG. 8A is a data table setting forth information representative of performance benchmarks obtained by the shared-platform type implementation of the stand-alone Aggregation Server of the illustrative embodiment serving the conventional OLAP server (i.e. Oracle EXPRESS Server) shown in FIG. 7B, wherein the common hardware/software platform is realized using a Pentium II 450 Mhz, 1 GB RAM, 18 GB Disk, running the Microsoft NT operating system (OS);

FIG. 9A is a schematic representation of the first stage in the method of segmented aggregation according to the principles of the present invention, showing initial aggregation along the 1st dimension;

FIG. 9C1 is a schematic representation of the Query Directed Roll-up (QDR) aggregation method/procedure of the present invention, showing data aggregation starting from existing basic data or previously aggregated data in the first dimension (D1), and such aggregated data being utilized as a basis for QDR aggregation along the second dimension (D2);

FIG. 9C2 is a schematic representation of the Query Directed Roll-up (QDR) aggregation method/procedure of the present invention, showing initial data aggregation starting from existing previously aggregated data in the second third (D3), and continuing along the third dimension (D3), and thereafter continuing aggregation along the second dimension (D2);

FIG. 10B is a schematic representation of the data organization of data files and the directory file used in the storages of the MDDB of FIG. 6B, and the method of searching for a queried data point therein using a simple binary search technique due to the data files ascending order;

DETAILED DESCRIPTION OF THE PREFERRED EMBODIMENTS OF THE PRESENT INVENTION

Figure 1A:
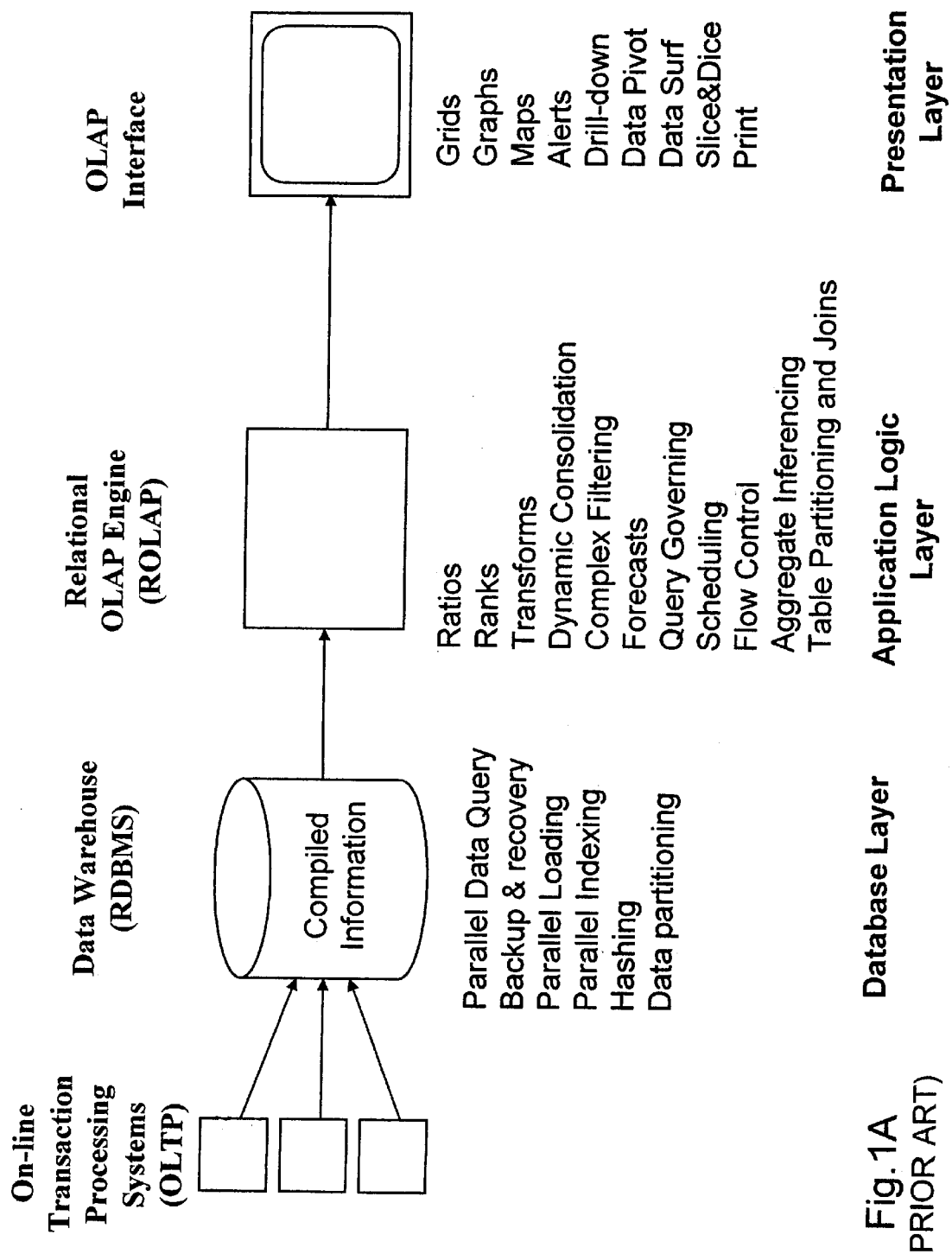
FIG. 1A is a schematic representation of an exemplary prior art relations on-line analytical processing (ROLAP) system comprising a three-tier or layer client/server architecture, wherein the first tier has a database layer utilizing relational databases (RDBMS) for data storage, access, and retrieval processes, the second tier has an application logic layer (i.e. the ROLAP engine) for executing the multidimensional reports from multiple users, and the third tier integrates the ROLAP engine with a variety of presentation layers, through which users perform OLAP analyses.

Referring now to FIGS. 6A through 13, the preferred embodiments of the method and system of the present invention will be now described in great detail hereinbelow, wherein like elements in the Drawings shall be indicated by like reference numerals.

Through this invention disclosure, the term "aggregation" and "preaggregation" shall be understood to mean the process of summation of numbers, as well as other mathematical operations, such as multiplication, subtraction, division etc.

In general, the stand-alone aggregation server and methods of and apparatus for data aggregation of the present invention can be employed in a wide range of applications, including MOLAP systems, ROLAP systems, Internet URL-directory systems, personalized on-line e-commerce shopping systems, Internet-based systems requiring real-time control of packet routing and/or switching, and the like.

For purposes of illustration, initial focus will be accorded to improvements in MOLAP systems, in which knowledge workers are enabled to intuitively, quickly, and flexibly manipulate operational data within a MDDB using familiar business terms in order to provide analytical insight into a business domain of interest.

Figure 6A:
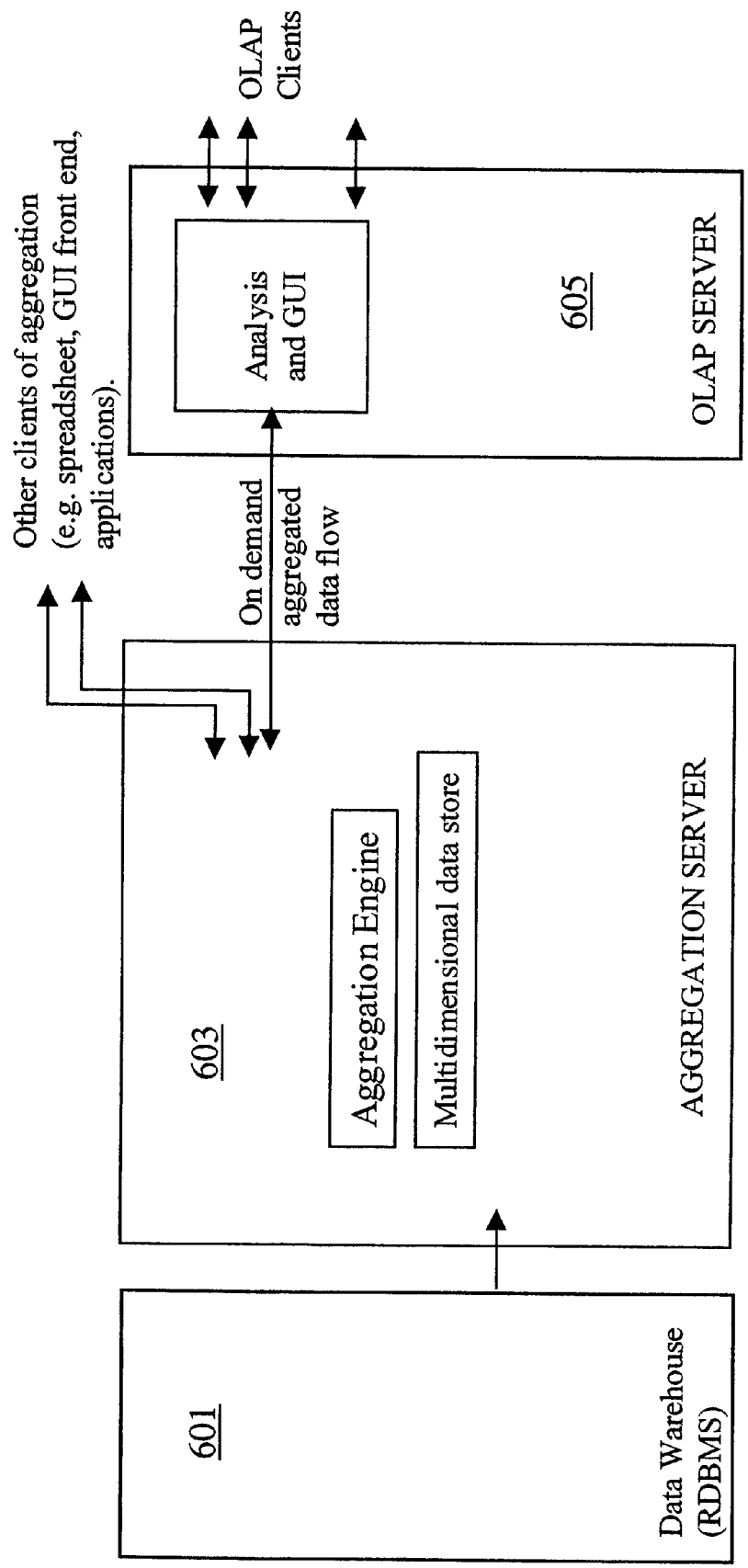
FIG. 6A is a schematic representation of a generalized embodiment of a multidimensional on-line analytical processing (MOLAP) system of the present invention comprising a Data Warehouse realized as a relational database, a stand-alone Aggregation Server of the present invention having an integrated aggregation engine and MDDB, and an OLAP server supporting a plurality of OLAP clients, wherein the stand-alone Aggregation Server performs aggregation functions (e.g. summation of numbers, as well as other mathematical operations, such as multiplication, subtraction, division etc.) and multi-dimensional data storage functions.

FIG. 6A illustrates a generalized embodiment of a multidimensional on-line analytical processing (MOLAP) system of the present invention comprising: a Data Warehouse 601 realized as a relational database; a stand-alone cartridge-style Aggregation Server 603 of the present invention having an integrated aggregation engine and a MDDB; and an OLAP server 605 communicating with the Aggregation Server 603, and supporting a plurality of OLAP clients. In accordance with the principles of the present invention, the stand-alone Aggregation Server 603 performs aggregation functions (e.g. summation of numbers, as well as other mathematical operations, such as multiplication, subtraction, division etc.) and multidimensional data storage functions. Departing from conventional practices, the principles of the present invention teaches moving the aggregation engine and the MDDB into a separate Aggregation Server 603 having standardized interfaces so that it can be plugged-into the OLAP system of virtually any user or vendor. This feature is illustrated in FIG. 6E wherein the Aggregation Server 603 can be plugged into (e.g. interfaced to) OLAP Servers (two shown as 605' and 605") of different users or vendors. As shown, the Aggregation Server 603 is operably plugged into (e.g. interfaced to) OLAP Server 605' of one user or vendor, yet it is also capable of being operably plugged into OLAP server 605" of another user or vendor, as indicated by the dotted lines. This dramatic move discontinues the restricting dependency of aggregation from the analytical functions of OLAP, and by applying novel and independent algorithms. The stand-alone data aggregation server enables efficient organization and handling of data, fast aggregation processing, and fast access to and retrieval of any data element in the MDDB.

Departing from conventional practices, the principles of the present invention teaches moving the aggregation engine and the MDDB into a separate Aggregation Server having standardized interfaces so that it can be plugged-into the OLAP system of virtually any user or vendor. This dramatic move discontinues the restricting dependency of aggregation from the analytical functions of OLAP, and by applying novel and independent algorithms. The stand-alone data aggregation server enables efficient organization and handling of data, fast aggregation processing, and fast access to and retrieval of any data element in the MDDB.

As will be described in greater detail hereinafter, the Aggregation Server 603 of the present invention can serve the data aggregation requirements of other types of systems besides OLAP systems such as, for example, URL directory management Data Marts, RDBMS, or ROLAP.

The Aggregation Server 603 of the present invention excels in performing two distinct functions, namely: the aggregation of data in the MDDB: and the handling of the resulting data base in the MDDB, for "on demand" client use. In the case of serving an OLAP system, the Aggregation Server 603 of the present invention focuses on performing these two functions in a high performance manner (i.e. aggregating and storing base data, originated at the Data Warehouse, in a multidimensional storage (MDDB), and providing the results of this data aggregation process "on demand" to the clients, such as the OLAP server 605, spreadsheet applications, the end user applications. As such, the Aggregation Server 603 of the present invention frees each conventional OLAP server 605, with which it interfaces, from the need of making data aggregations, and therefore allows the conventional OLAP server 605 to concentrate on the primary functions of OLAP servers, namely: data analysis and supporting a graphical interface with the user client.

Figure 6B:
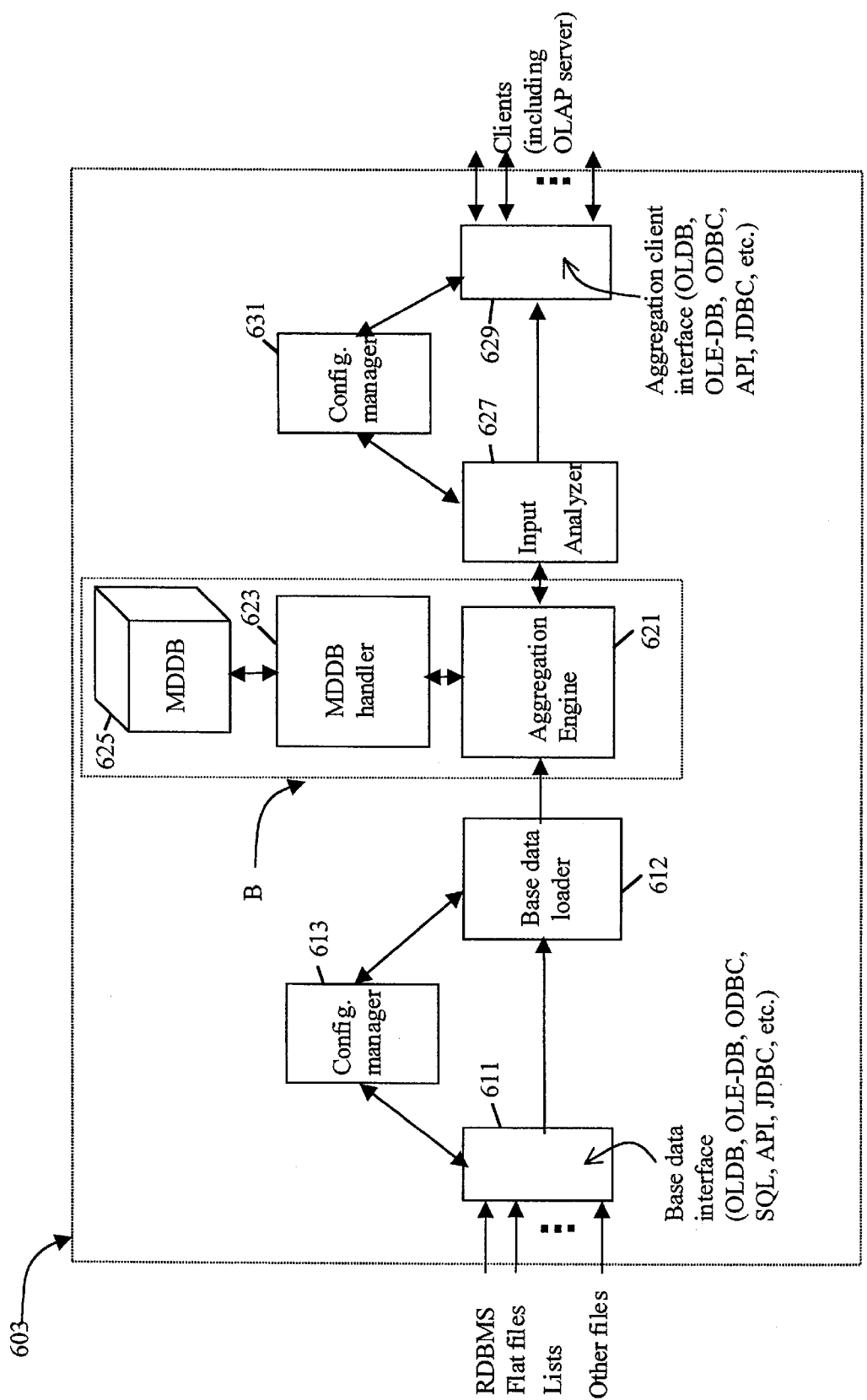
FIG. 6B is a schematic block diagram of the stand-alone Aggregation Server of the illustrative embodiment shown in FIG. 6A, showing its primary components, namely, a base data interface (e.g. OLDB, OLE-DB, ODBC, SQL, API, JDBC, etc.) for receiving RDBMS flat files lists and other files from the Data Warehouse (RDBMS), a base data loader for receiving base data from the base data interface, configuration manager for managing the operation of the base data interface and base data loader, an aggregation engine for receiving base data from the base loader, a multi-dimensional database (NDDB), a MDDB handler for handling the movement of base data and aggregation data between the aggregation engine and the MDDS, an input analyzer, an aggregation client interface (e.g. OLDB, OLF-DB, ODBC, SQL, API, JDBC, etc., for receiving requests from clients (such as an OLAP Server, spreadsheet application, end-user application) and receiving data files from the input analyzer for transfer to requesting clients, and a configuration manager for managing the operation of the input analyzer and the aggregation client interface.

FIG. 6B shows the primary components of the stand-alone Aggregation Server 603 of the illustrative embodiment, namely: a base data interface 611 (e.g. OLDB, OLE-DB, ODBC, SQL, API, JDBC, etc.) for receiving RDBMS flat files lists and other files from the Data Warehouse (RDBMS), a base data loader 612 for receiving base data from the base data interface 611, configuration manager 613 for managing the operation of the base data interface 611 and base data loader 612, an aggregation engine 621 for receiving base data from the base loader 612, a multi-dimensional database (MDDB) 625; a MDDB handler 622, an input analyzer 627, an aggregation client interface 629 (e.g. OLDB, OLE-DB, ODBC, SQL, API, JDBC, etc.) and a configuration manager 631 for managing the operation of the input analyzer 627 and the aggregation client interface 629.

During operation, the base data originates at data warehouse or other sources, such as external ASCII files. MOLAP server, or others. The Configuration Manager 613, in order to enable proper communication with all possible sources and data structures, configures two blocks, the Base Data Interface 611 and Data Loader 612. Their configuration is matched with different standards such as OLDB, OLE-DB, ODBC, SQL, API, JDBC, etc.

As shown in FIG. 6B, the core of the data Aggregation Server 603 of the present invention comprises: a data Aggregation Engine 621; a MDDB Handler 623; and a Multidimensional Database (MDDB) 625. The results of data aggregation are efficiently stored in a multidimensional structure within the Multidimensional Database (MDDB) 625, by the MDDB Handler 623.

As shown in FIGS. 6A and 6B, the stand-alone Aggregation Server 603 of the present invention serves the OLAP Server 605 via standard interfaces, such as OLDB, OLE-DB, ODBC, SQL, API, JDBC, etc. Aggregation results required by the OLAP Server 605 are supplied on demand. Typically, the OLAP Server 605 disintegrates the query, via parsing process, into series of requests. Each such request, specifying a n-dimensional coordinate, is presented to the Aggregation Server 603 for the coordinate's value. The Configuration Manager 631 sets the Aggregation Client Interface 629 and input Analyzer 627 for a proper communication protocol according to the client user (e.g. OLAP Server 605). The Input Analyzer 627 converts the input format to make it suitable for the MDDB Handler 623.

An object of the present invention is to make the transfer of data completely transparent to the OLAP user, in a manner which is equivalent to the storing of data in the cache of the OLAP serverrs 605 and without any query delays. This requires that the stand-alone Aggregation Server 603 have exceptionally fast response characteristics. This object is enabled by providing the unique data structure and aggregation mechanism of the present invention.

Figure 6C:
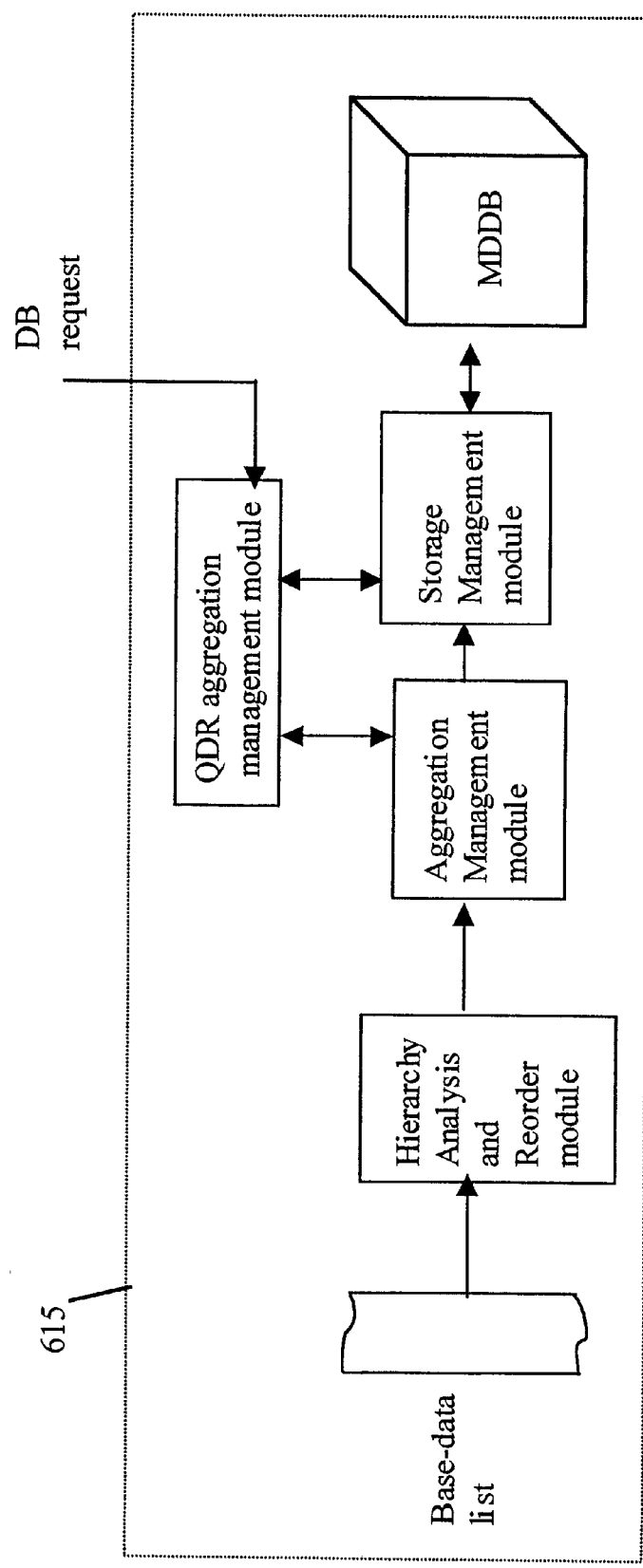
FIG. 6C is a schematic representation of the software modules comprising the aggregation engine and MDDB handler of the stand-alone Aggregation Server of the illustrative embodiment of the present invention, showing a base data list structure being supplied to a hierarchy analysis and reorder module, the output thereof being transferred to an aggregation management module, the output thereof being transferred to a storage module via a storage management module, and a Query Directed Roll-up (QDR) aggregation management module being provided for receiving database (DB) requests from OLAP client machines and managing the operation of the aggregation and storage management modules of the present invention.

FIG. 6C shows the software modules comprising the aggregation engine and MDDB handler components 615 of the stand-alone Aggregation Server 603 of the illustrative embodiment. The base data list, as it arrives from RDBMS or text files. has to be analyzed and reordered to optimize hierarchy handling, according to the unique method of the present invention, as described later with reference to FIGS. 11A and 11B.

Figure 9B:
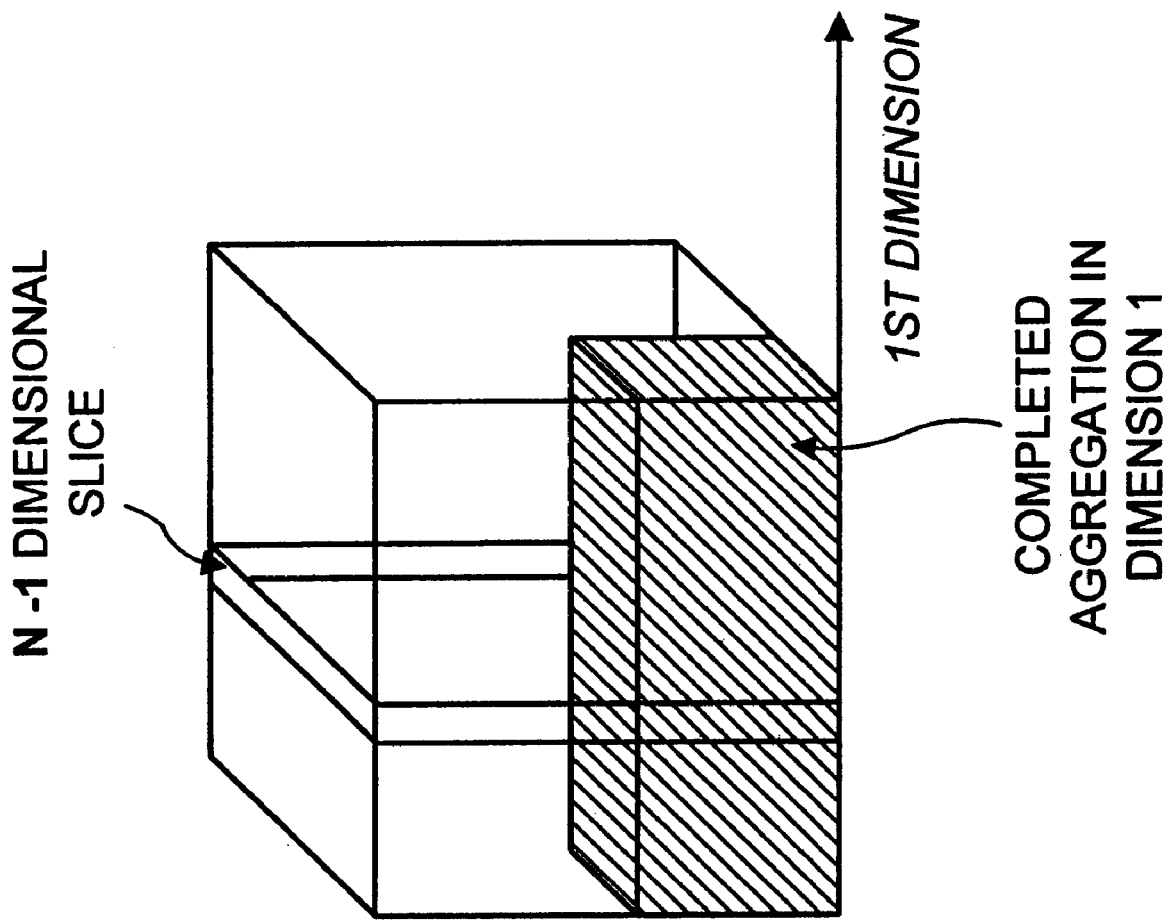
FIG. 9B is a schematic representation of the next stage in the method of segmented aggregation according to the principles of the present invention, showing that any segment along dimension 1, such as the shown slice, can be separately aggregated along the remaining dimensions, 2 and 3, and that in general, for an N dimensional system, the second stage involves aggregation in N−1 dimensions. The principle of segementation can be applied on the first stage as well, however, only a large enough data will justify such a sliced procedure in the first dimension. Actually, it is possible to consider each segment as an N−1 cube, enabling recursive computation.

The function of the aggregation management module is to administrate the aggregation process according to the method illustrated in FIGS. 9A and 9B.

In accordance with the principles of the present invention, data aggregation within the stand-alone Aggregation Server 603 can be carried out either as a complete pre-aggregation process, where the base data is fully aggregated before commencing querying, or as a query directed roll-up (QDR) process, where querying is allowed at any stage of aggregation using the "on-the-fly" data aggregation process of the present invention. The QDR process will be described hereinafter in greater detail with reference to FIG. 9C. The response to a request (i.e. a basic component of a client query), by calling the Aggregation management module for "on-the-fly" data aggregation, or for accessing preaggregated result data via the MDDB Handler module. The query/request serving mechanism of the present invention within the QDR aggregation management module is illustrated in the flow chart of FIG. 6D.

The function of the MDDB Handler (i.e., "management") module is to handle multidimensional data in the MDDB 625 in a very efficient way, according to the novel method of the present invention, which will be described in detail hereinafter with reference to FIGS. 10A and 10B.

Figure 6D:
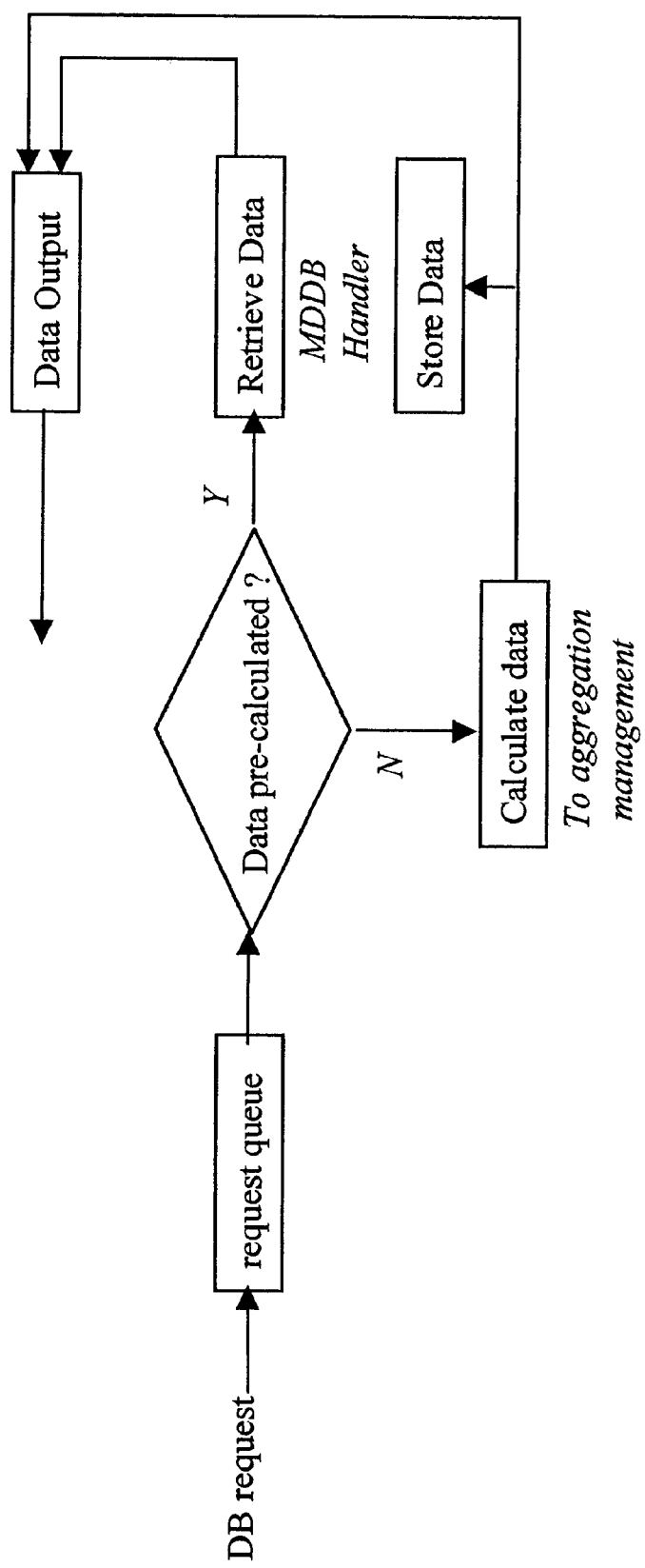
FIG. 6D is a flow chart representation of the primary operations carried out by the (DB) request serving mechanism within the QDR aggregation management module shown in FIG. 6C.
Figure 6E:
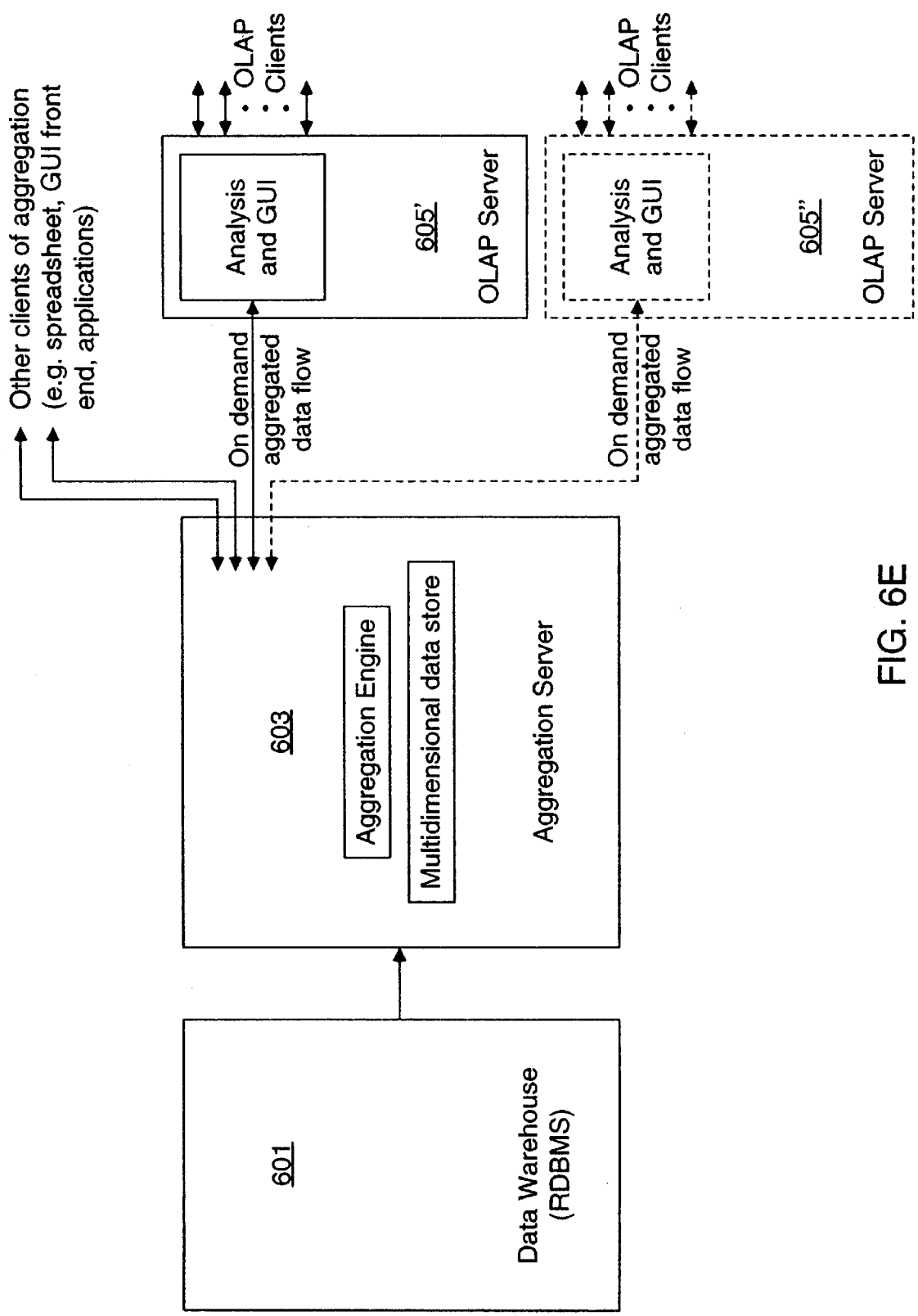
FIG. 6E is a schematic representation of a generalized embodiment of a multidimensional on-line analytical processing (MOLAP) system of the present invention comprising, a Data Warehouse realized as a relational database a stand-alone Aggregation Server of the present invention, having an integrated aggregation engine and MDDB, that is capable of being plugged into (i.e., interfaced to) OLAP servers (two shots) of different users or vendors each supporting a plurality of OLAP clients; the stand-alone Aggregation Server performs aggregation functions (e.g. summation of numbers, as well as other mathematical operations, such as multiplication, subtraction, division etc.) and multi-dimensional data storage functions for such OLAP Server(s)

The request serving mechanism shown in FIG. 6D is controlled by the QDR aggregation management module. Requests are queued and served one by one. If the required data is already pre-calculated, then it is retrieved by the MDDB Handler module and returned to the client (e.g., OLAP Server 605). Otherwise, the required data is calculated "on-the-fly" by the aggregation management module, and the result moved out to the client (e.g., OLAP Server 605), while simultaneously stored by the MDDB Handler module, shown in FIG. 6C.

Figure 7A:
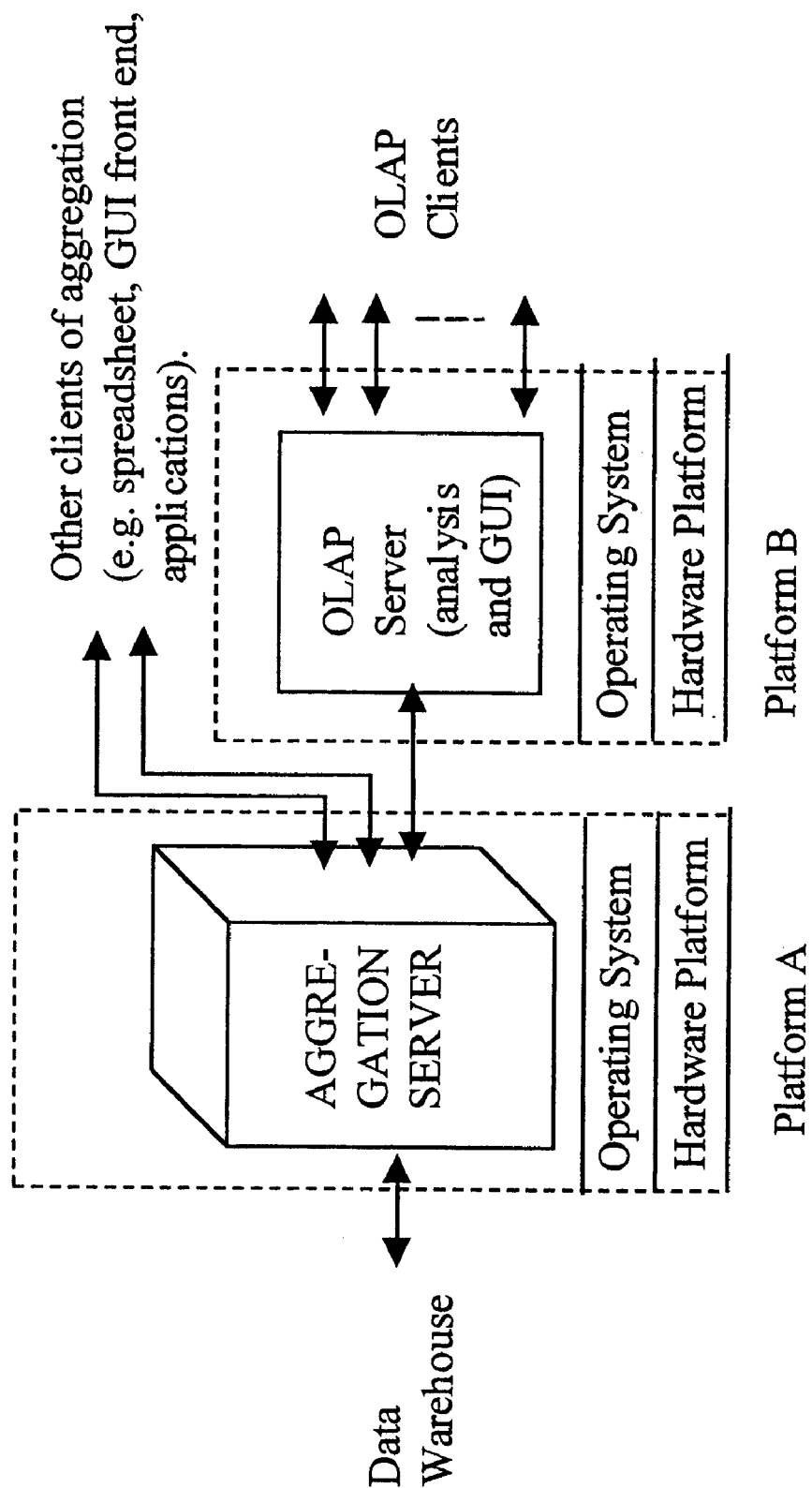
FIG. 7A is a schematic representation of a separate-platform type implementation of the stand-alone Aggregation Server of the illustrative embodiment of FIG. 6B and a conventional OLAP server supporting a plurality of client machines, wherein base data from a Data Warehouse is shown being received by the aggregation server, realized on a first hardware/software platform (i.e. Platform A) and the stand-alone Aggregation Server is shown serving the conventional OLAPserver, realized on a second hardware/software platform (i.e. Platform B), as well as serving data aggregation requirements of other clients supporting diverse applications such as spreadsheet, GUI front end, and applications.
Figure 7B:
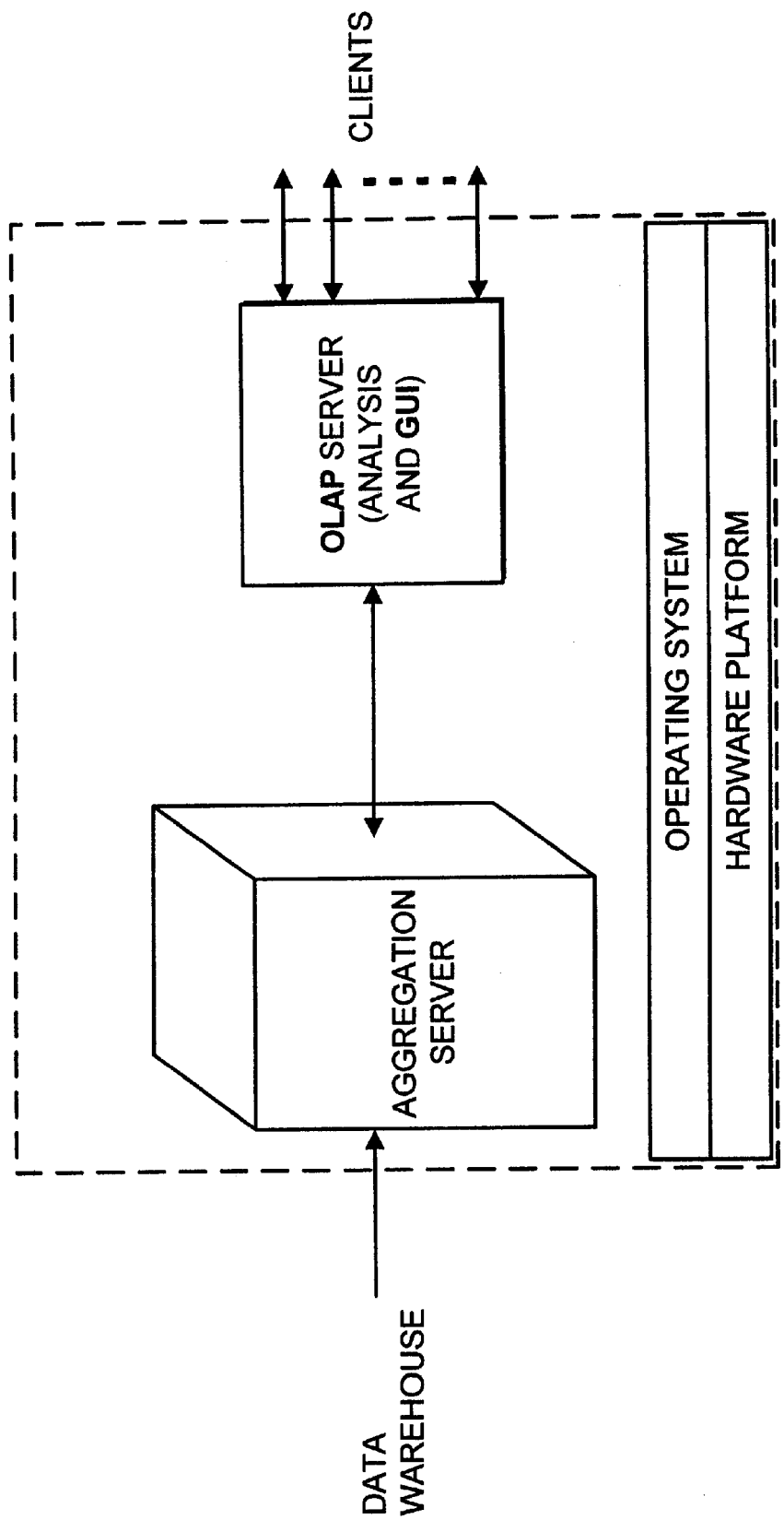
FIG. 7B is a schematic representation of a shared-platform type implementation of the stand-alone Aggregation Server of the illustrative embodiment of FIG. 6B and a conventional OLAP server supporting a plurality of client machines, wherein base data from a Data Warehouse is shown being received by the stand-alone Aggregation Server, realized on a common hardware/software platform and the aggregation server is shown serving the conventional OLAP server, realized on the same common hardware/software platform, as well as serving data aggregation requirements of other clients supporting diverse applications such as spreadsheet, GUI front end, and applications.

FIGS. 7A and 7B outline two different implementations of the stand-alone (cartridge-style) Aggregation Server 603 of the present invention. In both implementations, the Aggregation Server 603 supplies aggregated MDDB results to a client (e.g., OLAP Server 605).

FIG. 7A shows a separate-platform implementation of the MOLAP system of the illustrative embodiment shown in FIG. 6A, wherein the Aggregation Server 603 of the present invention resides on a separate hardware platform and OS system from that used to run the OLAP server 605. In this type of implementation, it is even possible to run the Aggregation Server 603 and the OLAP Server 605 on different-type operating systems (e.g. NT. Unix, MAC OS).

FIG. 7B shows a common-platform implementation of the MOLAP system of the illustrative embodiment shown in FIG. 6B, wherein the Aggregation Server 603 of the present invention shares the same hardware platform and operating system (OS) that used to run the client OLAP Server 605.

FIG. 8A shows a table setting forth the benchmark results of an aggregation engine, implemented on a shared/common hardware platform and OS, in accordance with the principles of the present invention. The common platform and OS is realized using a Pentium II 450 Mhz, 1 GB RAM, 18 GB Disk, running the Microsoft NT operating system. The six (6) data sets shown in the table differ in number of dimensions, number of hierarchies, measure of sparcity and data size. A comparison with ORACLE Express, a major OLAP server, is made. It is evident that the aggregation engine of the present invention outperforms currently leading aggregation technology by more than an order of magnitude.

The segmented data aggregation method of the present invention is described in FIGS. 9A through 9C2. These figures outline a simplified setting of three dimensions only; however, the following analysis applies to any number of dimensions as well.

The data is being divided into autonomic segments to minimize the amount of simultaneously handled data. The initial aggregation is practiced on a single dimension only, while later on the aggregation process involves all other dimensions.

At the first stage of the aggregation method, an aggregation is performed along dimension 1. The first stage can be performed on more than one dimension. As shown in FIG. 9A, the space of the base data is expanded by the aggregation process.

In the next stage shown in FIG. 9B, any segment along dimension 1, such as the shown slice, can be separately aggregated along the remaining dimensions, 2 and 3. In general, for an N dimensional system, the second stage involves aggregation in N−1 dimensions.

The principle of data segmentation can be applied on the first stage as well. However, only a large enough data set will justify such a sliced procedure in the first dimension. Actually, it is possible to consider each segment as an N−1 cube, enabling recursive computation.

It is imperative to get aggregation results of a specific slice before the entire aggregation is completed, or alternatively, to have the roll-up done in a particular sequence. This novel feature of the aggregation method of the present invention is that it allows the querying to begin, even before the regular aggregation process is accomplished, and still having fast response. Moreover, in relational OLAP and other systems requiring only partial aggregations, the QDR process dramatically speeds up the query response.

The QDR process is made feasible by the slice-oriented roll-up method of the present invention. After aggregating the first dimension(s), the multidimensional space is composed of independent multidimensional cubes (slices). These cubes can be processed in any arbitrary sequence.

Consequently the aggregation process of the present invention can be monitored by means of files, shared memory sockets, or queues to statically or dynamically set the roll-up order.

In order to satisfy a single query coming from a client, before the required aggregation result has been prepared, the QDR process of the present invention involves performing a fast on-the-fly aggregation (roll-up) involving only a thin slice of the multidimensional data.

Figure 1B:
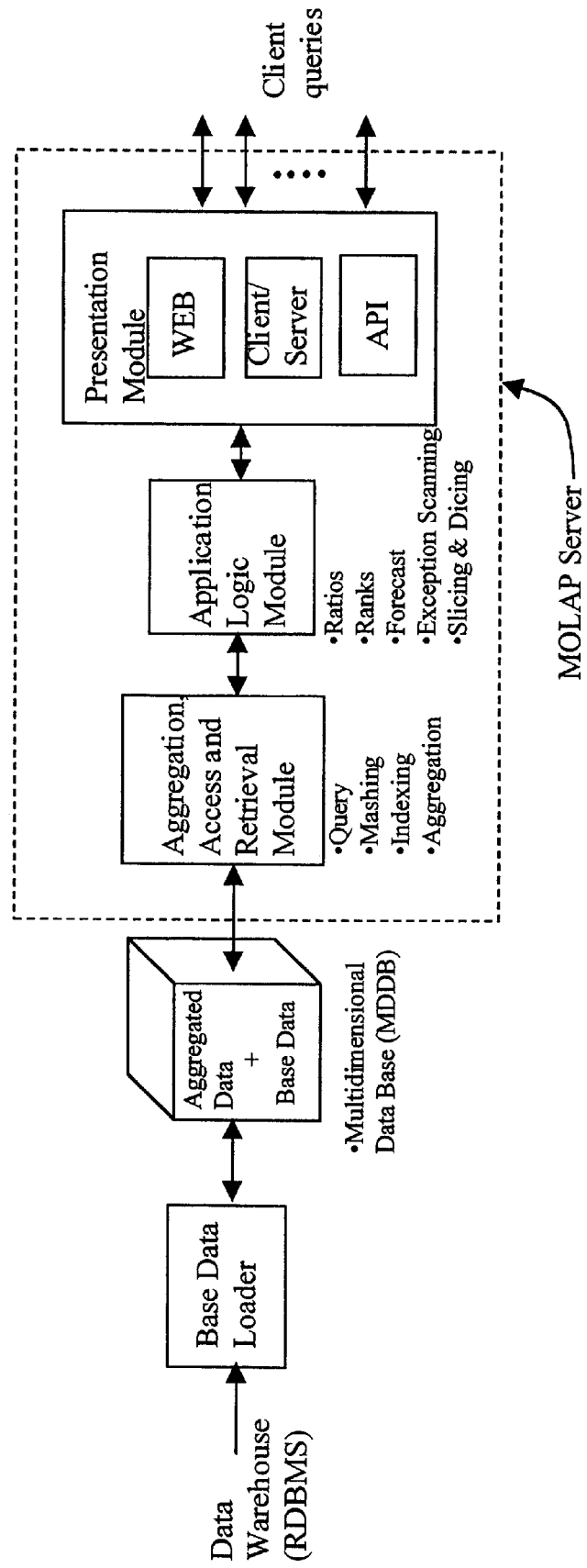
FIG. 1B is a schematic representation of a generalized embodiment of a prior art multidimensional on-line analytical processing (MOLAP) system comprising a base data loader for receiving atomic (i.e. base) data from a Data Warehouse realized by a RDBMS, an OLAP multidimensional database (MDDB), an aggregation, access and retrival module, application logic module and presentation module associated with a conventional OLAP sever (e.g. Oracle's Express Server) for supporting on-line transactional processing (OLTP) operations on the MDDB, to service database queries and requests from a plurality of OLAP client machines typically accessing the system from an information network (e.g. the Internet)
Figure 2A:
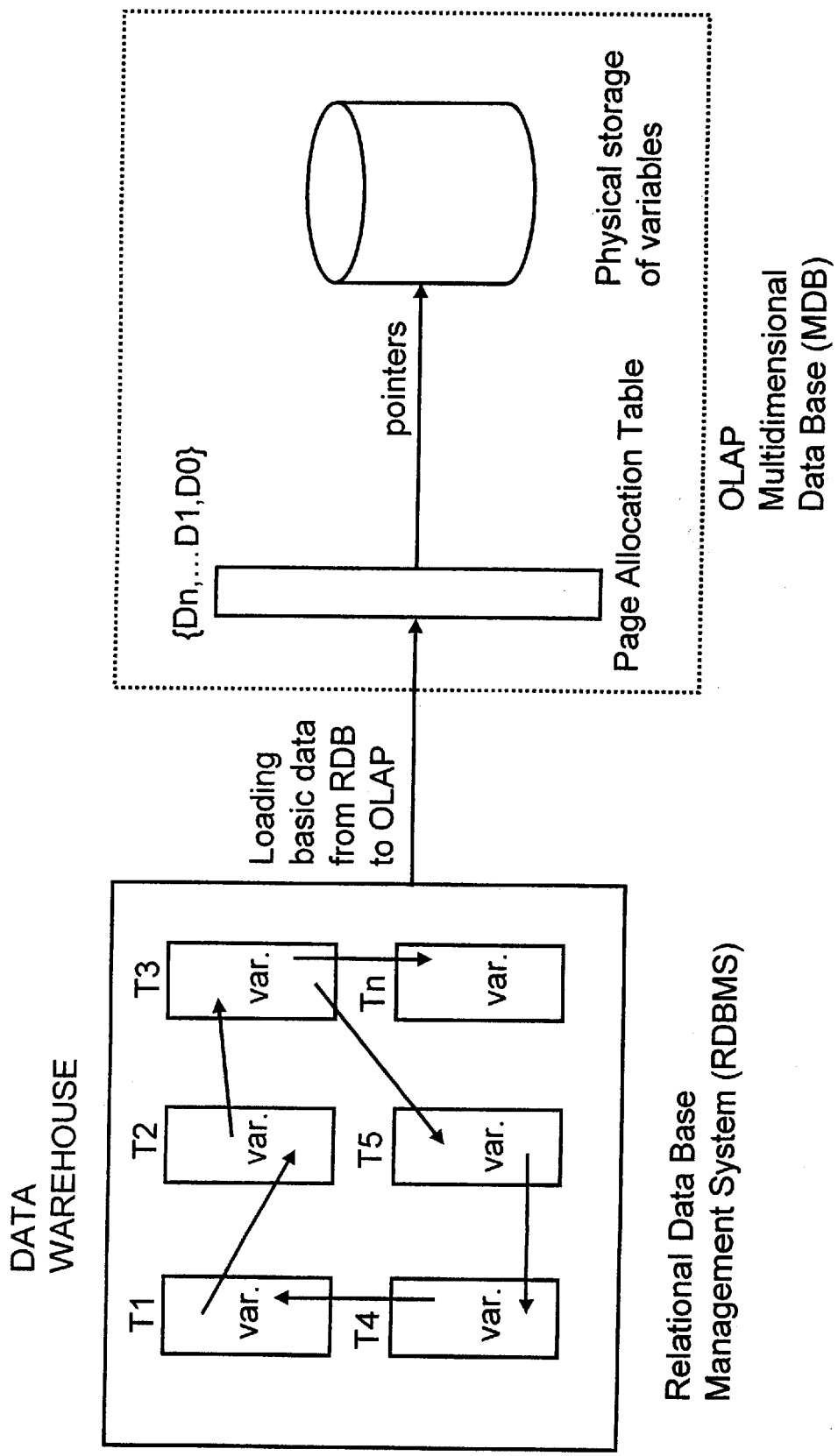
FIG. 2A is a schematic representation of the Data Warehouse shown in the prior art system of FIG. 1B comprising numerous data tables (e.g. T1, T2, . . . Tn) and data field links, and the OLAP multidimensional database shown of FIG. 1B, comprising a conventional page allocation table (PAT) with pointers pointing to the physical storage of variables in an information storage device.
Figure 2B:
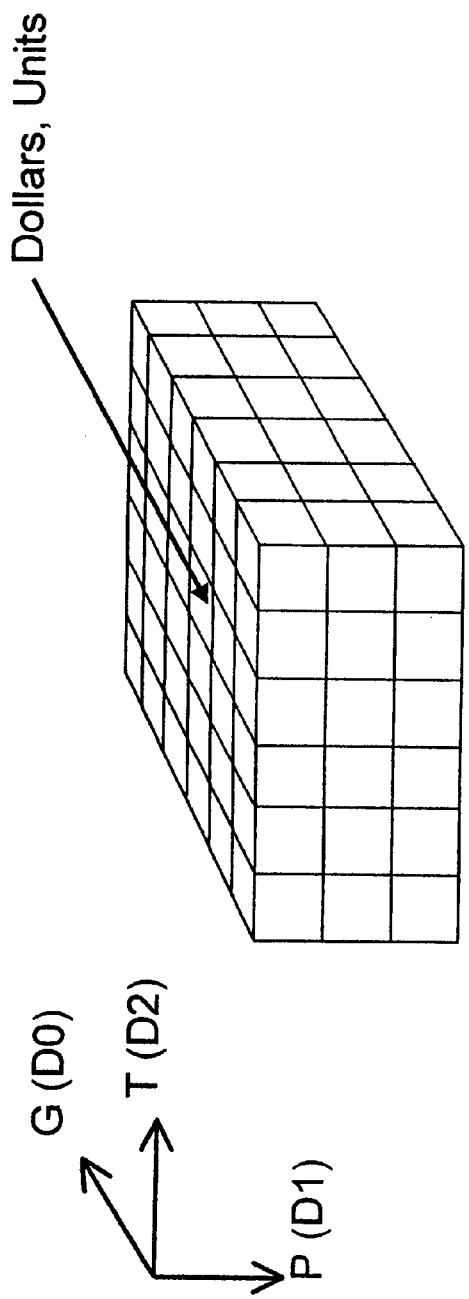
FIG. 2B is a schematic representation of an exemplary three-dimensional MDDB and organized as a 3-dimensional Cartesian cube and used in the prior art system of FIG. 2A, wherein the first dimension of the MDDB is representative of geography (e.g. cities, states, countries, continents), the second dimension of the MDDB is representative of time (e.g. days, weeks, months, years), the third dimension of the MDDB is representative of products (e.g. all products, by manufacturer), and the basic data element is a set of variables which are addressed by 3-dimensional coordinate values.
Figure 2C:
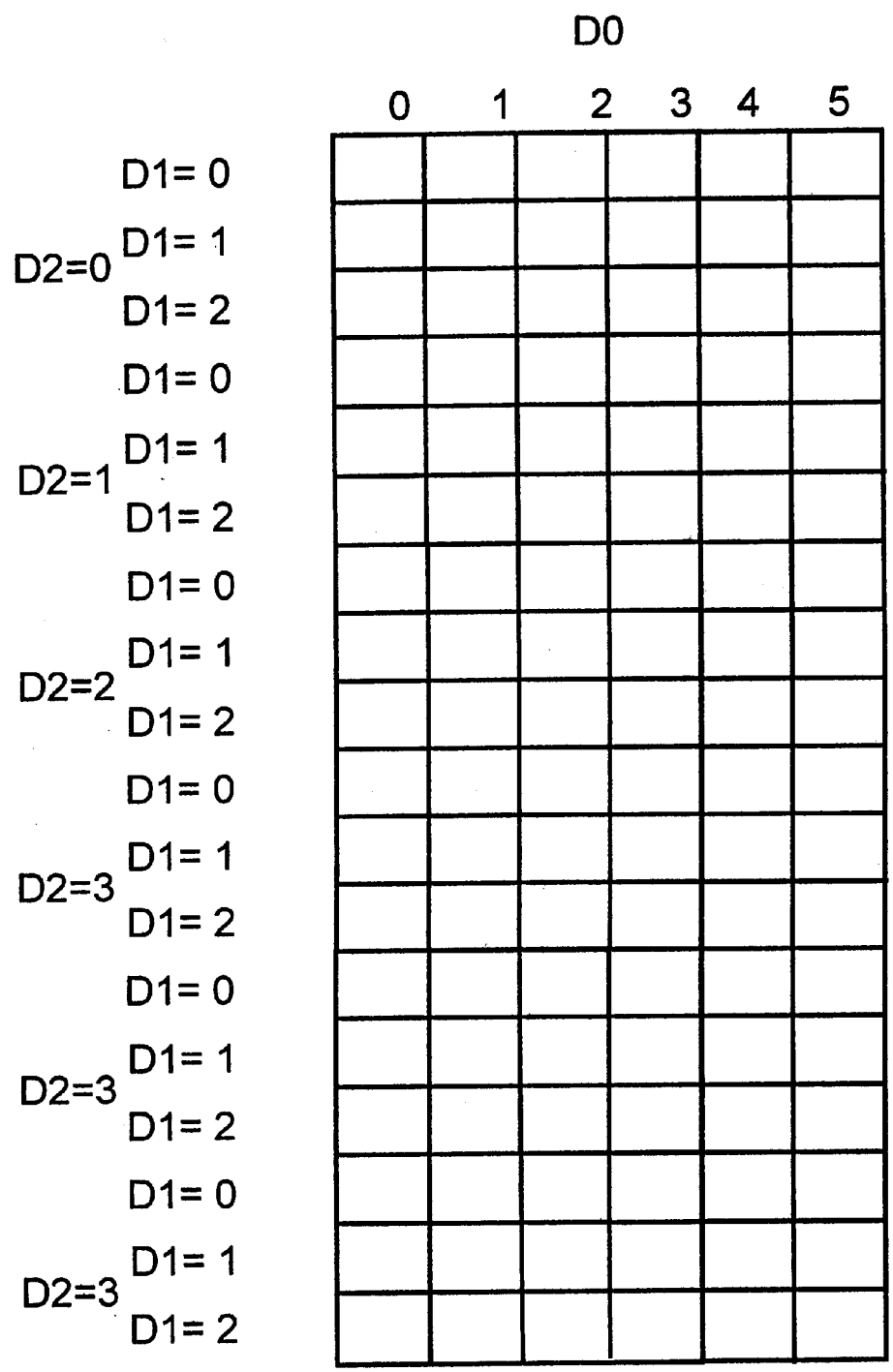
FIG. 2C is a schematic representation of a prior art array structure associated with an exemplary three-dimensional MDDB, arranged according to a dimensional hierarchy.
Figure 2D:
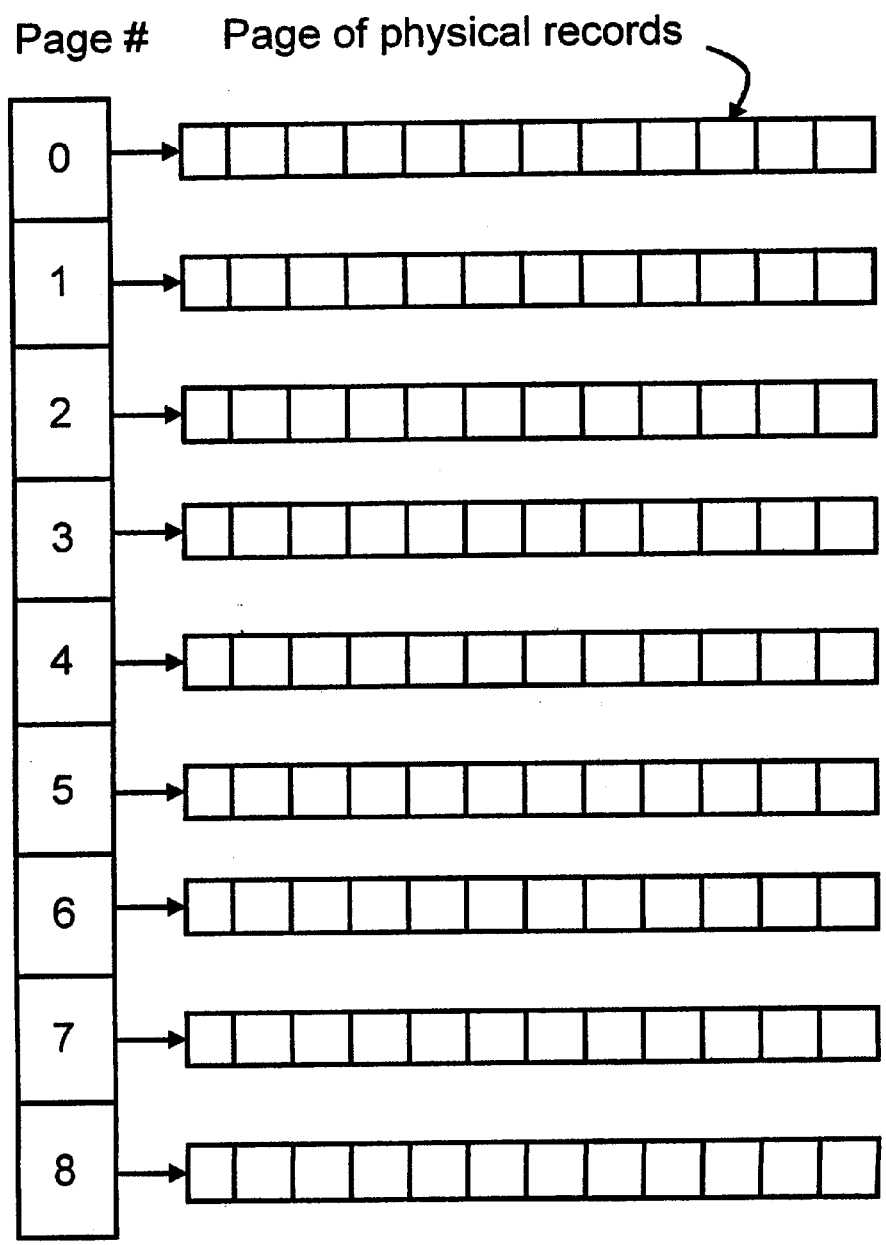
FIG. 2D is a schematic representation of a prior art page allocation table for an exemplary three-dimensional MDDB, arranged according to pages of data element addresses.
Figure 3A:
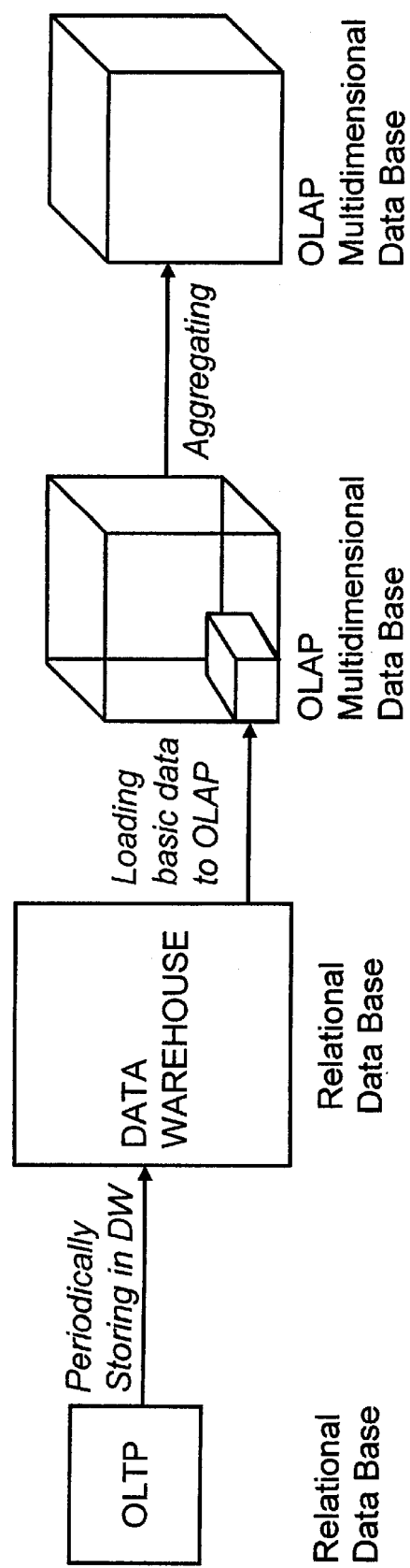
FIG. 3A is a schematic representation of a prior art MOLAP system, illustrating the process of periodically storing raw data in the RDBMS Data Warehouse thereof, serially loading of basic data from the Data Warehouse to the MDDB, and the process of serially pre-aggregating (or pre-compiling) the data in the MDDB along the entire dimensional hierarchy thereof.
Figure 3B:
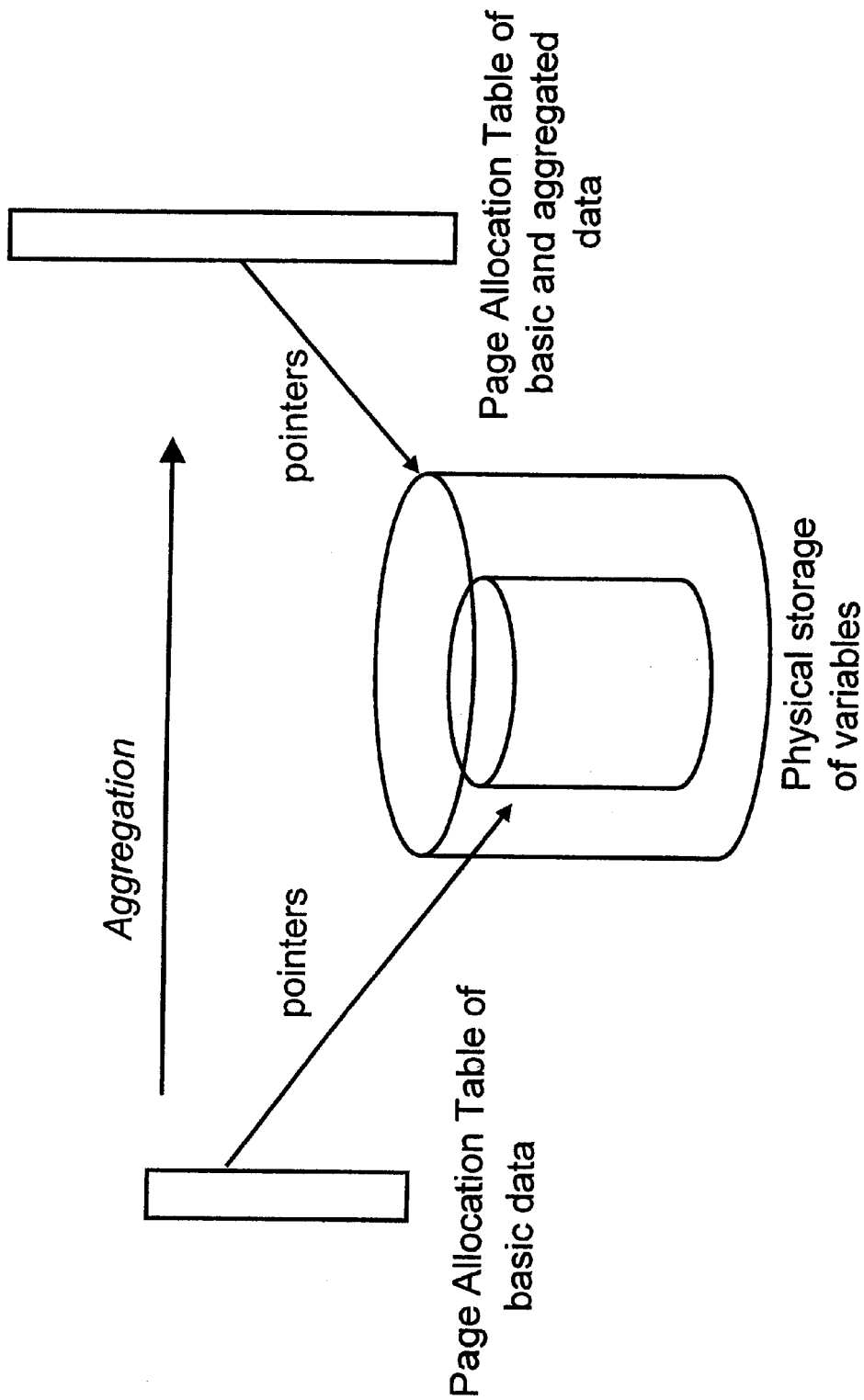
FIG. 3B is a schematic representation illustrating that the Cartesian addresses listed in a prior art page allocation table (PAT) point to where physical storage of data elements (i.e. variables) occurs in the information recording media (e.g. storage volumes) associated with the MDDB, during the loading of basic data into the MDDB as well as during data preaggregation processes carried out therewithin.
Figure 4:
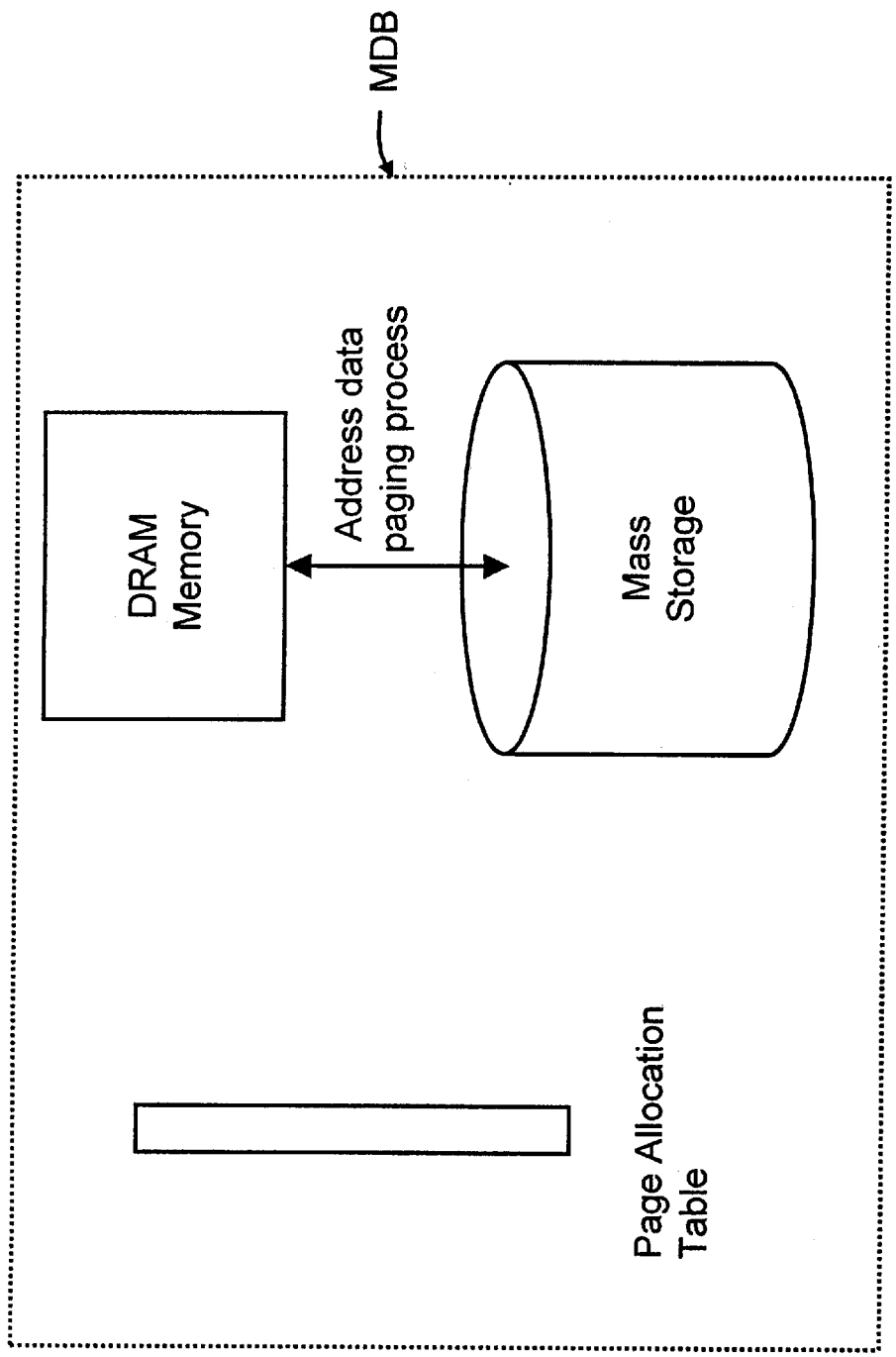
FIG. 4 is a schematic representation illustrating that, for very large prior art MDDBs, very large page allocation tables (PATs) are required to represent the address locations of the data elements contained therein, and thus there is a need to employ address data paging techniques between the DRAM (e.g. program memory) and mass storage devices (e.g. recording discs or RAIDs) available on the serial computing platform used to implement such prior art MOLAP systems.
Figure 5:
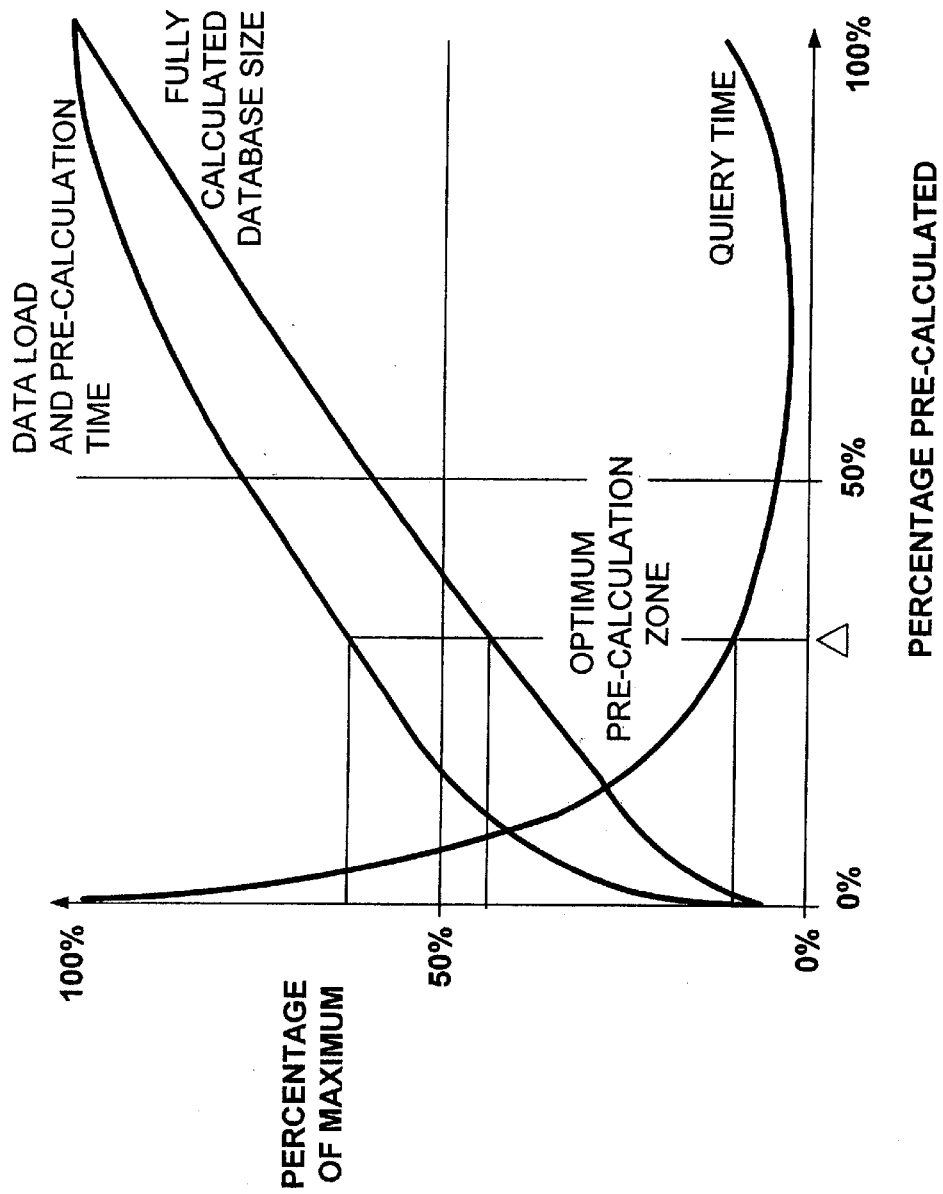
FIG. 5 is a graphical representation showing how search time in a conventional (i.e. prior art) MDDB increases in proportion to the amount of preaggregation of data therewithin.

FIG. 9C1 shows a slice required for building-up a roll-up result of the $2^{nd}$ dimension. In case 1, as shown, the aggregation starts from an existing data, either basic or previously aggregated in the first dimension. This data is utilized as a basis for QDR aggregation along the second dimension. In case 2, due to lack of previous data, a QDR involves an initial slice aggregation along dimension 3, and thereafter aggregation along the $2^{nd}$ dimension.

FIG. 9C2 shows two corresponding QDR cases for gaining results in the 3d dimension. Cases 1 and 2 differ in the amount of initial aggregation required in $2^{nd}$ dimension.

Figure 10A:
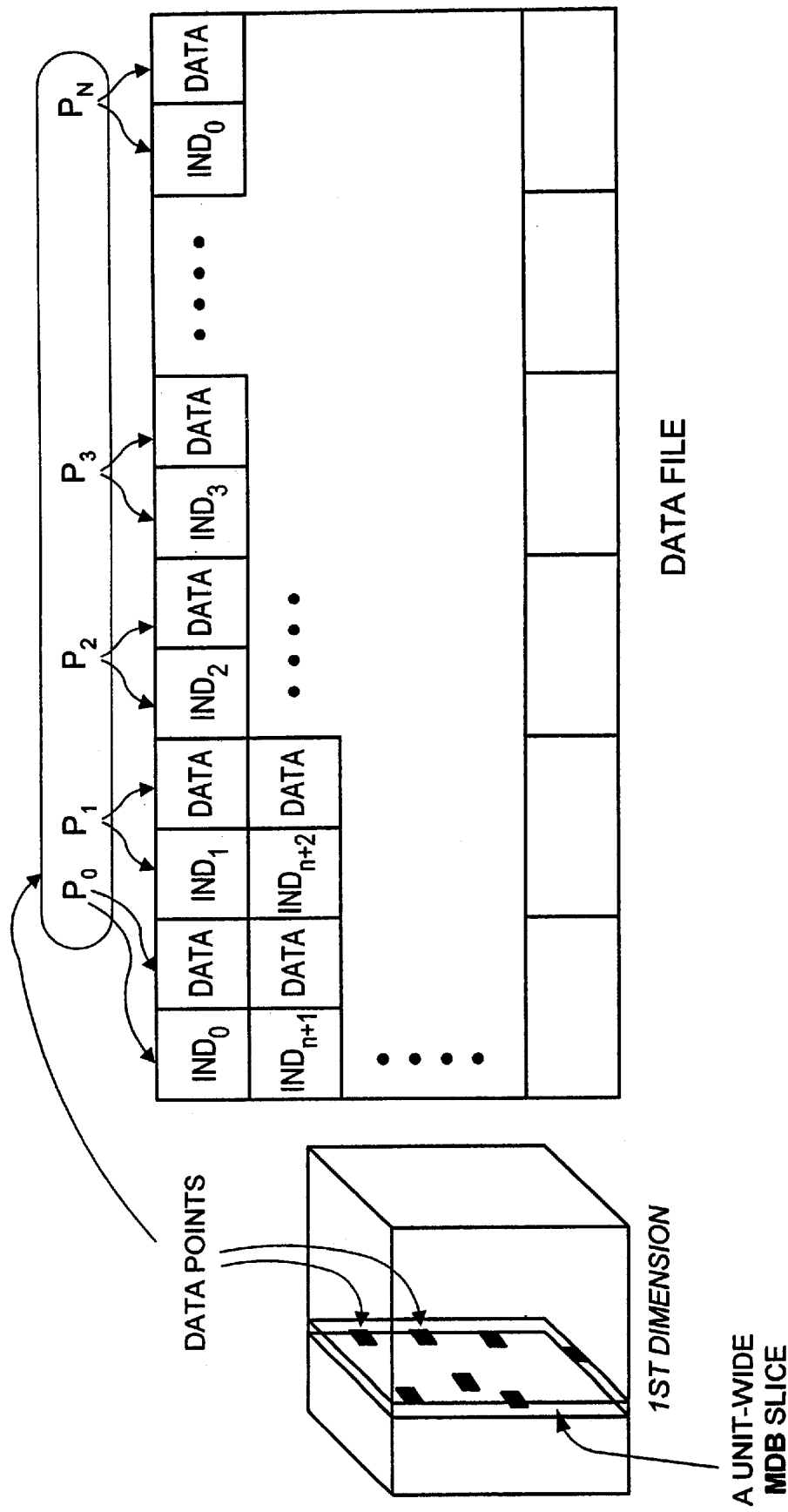
FIG. 10A is a schematic representation of the "slice-storage" method of storing sparse data in the disk storage devices of the MDDB of FIG. 6B in accordance with the principles of the present invention, based on an ascending-ordered index along aggregation direction, enabling fast retrieval of data.

FIG. 10A illustrates the "Slice-Storage" method of storing sparse data on storage disks. In general, this data storage method is based on the principle that an ascending-ordered index along aggregation direction, enables fast retrieval of data. FIG. 10A illustrates a unit-wide slice of the multidimensional cube of data. Since the data is sparse, only few non-NA data points exist. These points are indexed as follows. The Data File consists of data records, in which each n−1 dimensional slice is being stored, in a separate record. These records have a varying length, according to the amount of non-NA stored points. For each registered point in the record, $IND_k$ stands for an index in a n-dimensional cube, and Data stands for the value of a given point in the cube.

FIG. 10B illustrates a novel method for randomly searching for a queried data point in the MDDB of FIG. 6B by using a novel technique of organizing data files and the directory file used in the storages of the MDDB, so that a simple binary search technique can then be employed within the Aggregation Server of the present invention. According to this method, a metafile termed DIR File, keeps pointers to Data Files as well as additional parameters such as the start and end addresses of data record ($IND_0$, $IND_n$), its location within the Data File, record size (n), file's physical address on disk (D_Path), and auxiliary information on the record (Flags).

A search for a queried data point is then performed by an access to the DIR file. The search along the file can be made using a simple binary search due to file's ascending order. When the record is found, it is then loaded into main memory to search for the required point, characterized by its index $IND_k$. The attached Data field represents the queried value. In case the exact index is not found, it means that the point is a NA.

Figure 11A:
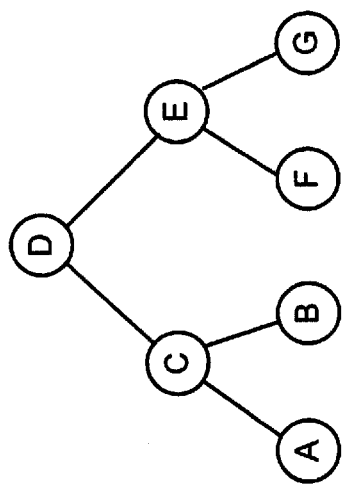
FIG. 11A is a schematic representation of three exemplary multi-hierarchical data structures for storage of data within the MDDB of FIG. 6B, having three levels of hierarchy, wherein the first level representative of base data is composed of items A,B,F, and G, the second level is composed of items C,E,H and I, and the third level is composed of a single item D, which is common to all three hierarchical structures.
Figure 11A:
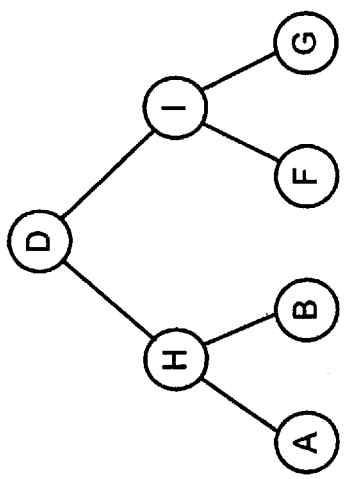
Figure 11B:
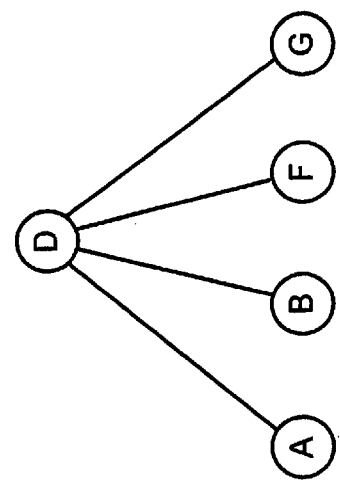
FIG. 11B is a schematic representation of an optimized multi-hierarchical data structure merged from all three hierarchies of FIG. 11A, in accordance with the principles of the present invention.
Figure 11B:
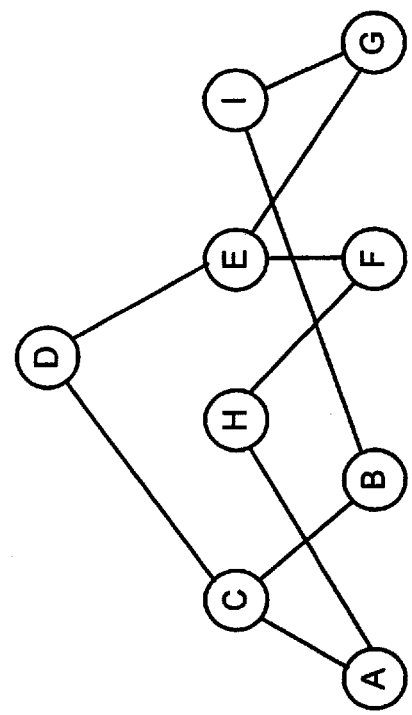

FIGS. 11A and 11B illustrate a novel method for pre-processing data such that multi-hierarchies in multi-hierarchical structures are optimally merged.

In particular, FIG. 11A illustrates a novel method which the stand-alone Aggregation Server employs for handling hierarchies. According to the devised method, the inner order of hierarchies within a dimension is optimized, to achieve efficient data handling for summations and other mathematical formulas (termed in general "Aggregation"). The order of hierarchy is defined externally. It is brought from a data source to the stand-alone aggregation engine, as a descriptor of data, before the data itself. In the illustrative embodiment, the method assumes hierarchical relations of the data, as shown in FIG. 11A. The way data items are ordered in the memory space of the Aggregation Server, with regard to the hierarchy, has a significant impact on its data handling efficiency.

Notably, when using prior art techniques, multiple handling of data elements, which occurs when a data element is accessed more than once during aggregation process, has been hitherto unavoidable when the main concern is to effectively handle the sparse data. The data structures used in prior art data handling methods have been designed for fast access to a non NA data. According to prior art techniques, each access is associated with a timely search and retrieval in the data structure. For the massive amount of data typically accessed from a Data Warehouse in an OLAP application, such multiple handling of data elements has significantly degraded the efficiency of prior art data aggregation processes. When using prior art data handling techniques, the data element D shown in FIG. 11A must be accessed three times, causing poor aggregation performance.

In accordance with the data handling method of the present present, the data is being pre-ordered for a singular handling, as opposed to multiple handling taught by prior art methods. According to the present invention, elements of base data and their aggregated results are contiguously stored in a way that each element will be accessed only once. This particular order allows a forward-only handling, never backward. Once a base data element is stored, or aggregated result is generated and stored, it is never to be retrieved again for further aggregation. As a result the storage access is minimized. This way of singular handling greatly elevates the aggregation efficiency of large data bases. An efficient handling method as used in the present invention, is shown in FIG. 7A. The data element D, as any other element, is accessed and handled only once.

FIG. 11A shows an example of a multi-hierarchical database structure having 3 hierarchies. As shown, the base data includes the items A,B,F, and G., The second level is composed of items C,E,H and I. The third level has a single item D, which is common to all three hierarchical structures. In accordance with the method of the present invention, a minimal computing path is always taken. For example, according to the method of the present invention, item D will be calculated as part of structure 1, requiring two mathematical operations only, rather than as in structure 3, which would need four mathematical operations. FIG. 11B depicts an optimized structure merged from all three hierarchies.

Figure 12:
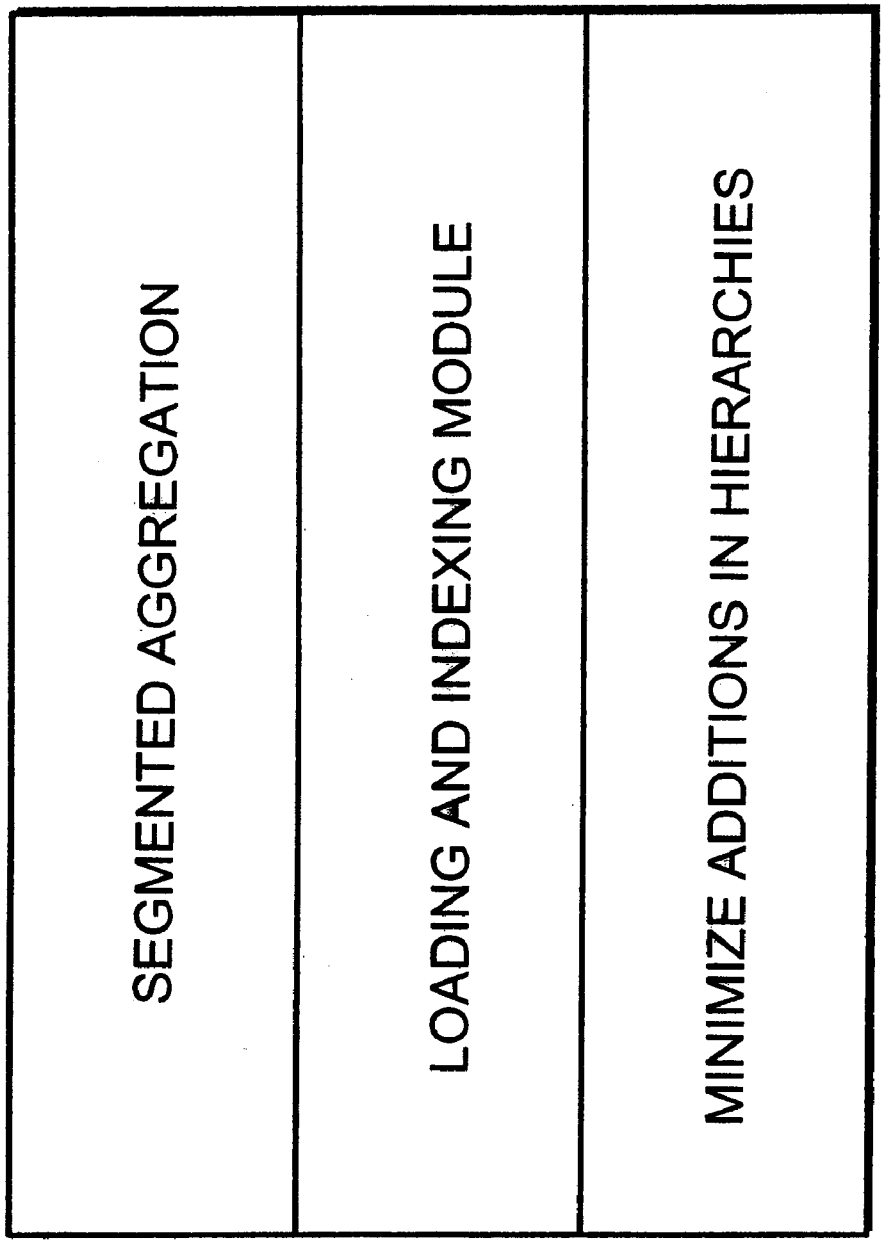
FIG. 12 is a schematic representation showing the levels of operations performed by the stand-alone Aggregation Server of FIG. 6B, summarizing the different enabling components for carrying out the method of segmented aggregation in accordance with the principles of the present invention.

FIG. 12 summarizes the different enabling components for segmented aggregation. The minimized operations in handling multi-hierarchies need analysis of the base data. It greatly optimizes data handling and contribute to aggregation speed. Based on this technology loading and indexing operations become very efficient, minimizing memory and storage access, and speeding up storing and retrieval operations. On top of all the enabling technologies is the segmented aggregation technique, not just outperforming by orders of magnitude the prior-art aggregation algorithms, but also enabling the unique QDR which waves out the need of waiting for full pre-aggregation.

Figure 13:
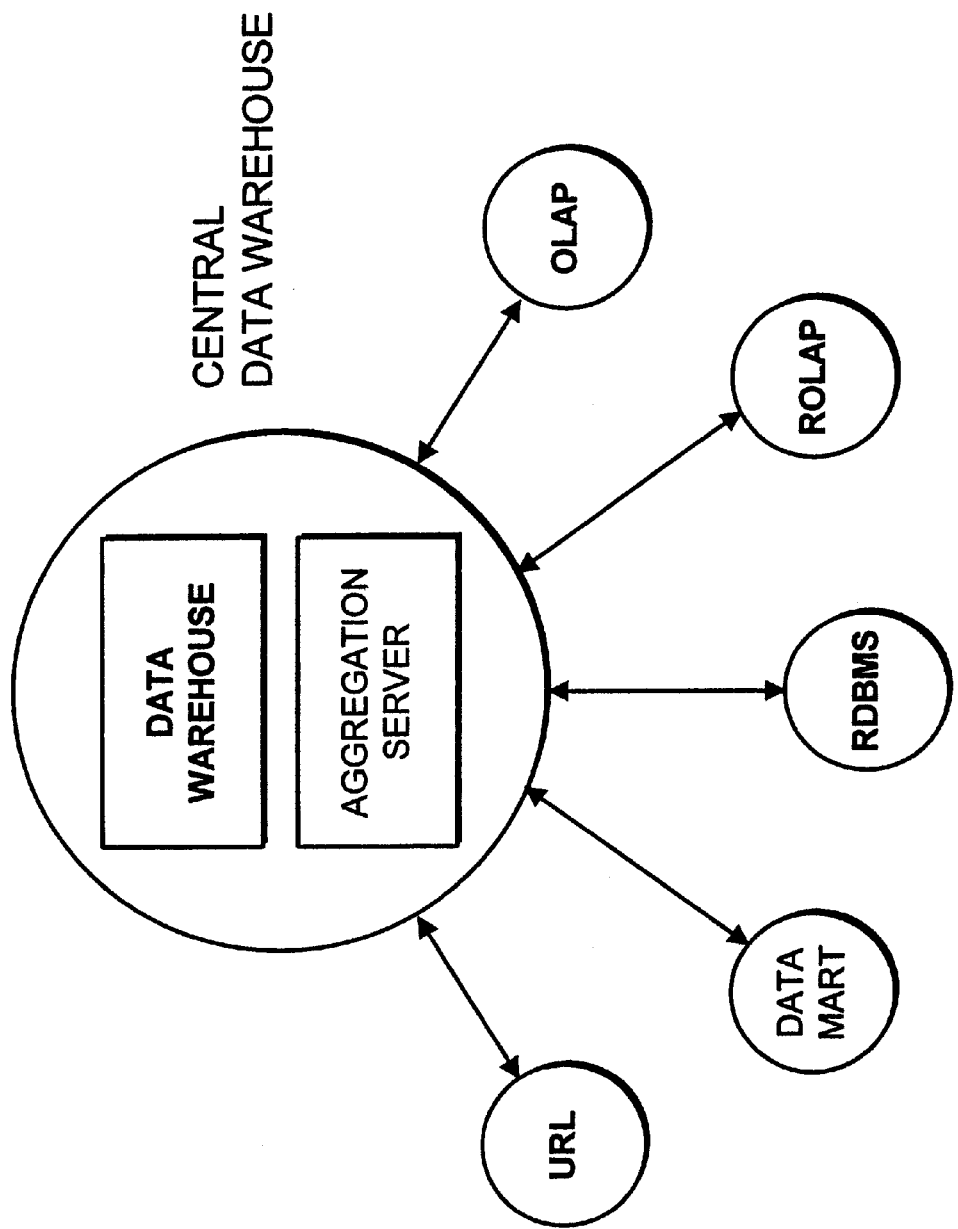
FIG. 13 is a schematic representation of the stand-alone Aggregation Server of the present invention shown as a component of a central data warehouse, serving the data aggregation needs of URL directory systems, Data Marts, RDBMSs, ROLAP systems and OLAP systems alike.

FIG. 13 shows the stand-alone Aggregation Server of the present invention as a component of a central data warehouse, serving the data aggregation needs of URL directory systems, Data Marts, RDBMSs, ROLAP systems and OLAP systems alike.

The reason for the central multidimensional database's rise to corporate necessity is that it facilitates flexible, high-performance access and analysis of large volumes of complex and interrelated data.

A stand-alone specialized aggregation server, simultaneously serving many different kinds of clients (e.g. data mart, OLAP, URL, RDBMS), has the power of delivering an enterprise-wide aggregation in a cost-effective way. This kind of server eliminates the roll-up redundancy over the group of clients, delivering scalability and flexibility.

Performance associated with central data warehouse is an important consideration in the overall approach. Performance includes aggregation times and query response.

Effective interactive query applications require near real-time performance, measured in seconds. These application performances translate directly into the aggregation requirements.

In the prior art, in case of MOLAP, a full pre-aggregation must be done before starting querying. In the present invention, in contrast to prior art, the query directed roll-up (QDR) allows instant querying, while the full pre-aggregation is done in the background. In cases a full pre-aggregation is preferred, the currently invented aggregation outperforms any prior art. For the ROLAP and RDBMS clients, partial aggregations maximize query performance. In both cases fast aggregation process is imperative. The aggregation performance of the current invention is by orders of magnitude higher than that of the prior art.

The stand-alone scalable aggregation server of the present invention can be used in any MOLAP system environment for answering questions about corporate performance in a particular market, economic trends, consumer behaviors, weather conditions, population trends, or the state of any physical, social, biological or other system or phenomenon on which different types or categories of information, organizable in accordance with a predetermined dimensional hierarchy, are collected and stored within a RDBMS of one sort or another. Regardless of the particular application selected, the address data mapping processes of the present invention will provide a quick and efficient way of managing a MDDB and also enabling decision support capabilities utilizing the same in diverse application environments.

Functional Advantages Gained by the Data Aggregation Server of the Present Invention The stand-alone "cartridge-style" plug-in features of the data aggregation server of the present invention, provides freedom in designing an optimized multidimensional data structure and handling method for aggregation, provides freedom in designing a generic aggregation server matching all OLAP vendors, and enables enterprise-wide centralized aggregation.

The method of Segmented Aggregation employed in the aggregation server of the present invention provides flexibility, scalability, a condition for Query Directed Aggregation, and speed improvement.

The method of Multidimensional data organization and indexing employed in the aggregation server of the present invention provides fast storage and retrieval, a condition for Segmented Aggregation, improves the storing, handling, and retrieval of data in a fast manner, and contributes to structural flexibility to allow sliced aggregation and QDR. It also enables the forwarding and single handling of data with improvements in speed performance.

The method of Query Directed Aggregation (QDR) employed in the aggregation server of the present invention minimizes the data handling operations in multi-hierarchy data structures.

The method of Query Directed Aggregation (QDR) employed in the aggregation server of the present invention eliminates the need to wait for full aggregation to be completed, and provides build-up aggregated data required for full aggregation.

It is understood that the System and Method of the illustrative embodiments described hereinabove may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the claims to Invention appended hereto.

What is claimed is:

1. A stand-alone data aggregation server for use with any one of a plurality of different OLAP servers that each provide an application layer and presentation layer through which multiple users perform OLAP analyses via interaction with client machines operably coupled thereto, the data aggregation server comprising:

an aggregation engine that is integrated with a multidimensional data store and an interface, the aggregation engine performing data aggregation operations on data loaded from, database and storing the resultant aggregated data in a multidimensional datastore; and the interface receiving requests communicated from any one of said plurality of differer; OLAP servers, accessing the aggregation engine to retrieve from the multidimensional datastore aggregated data pertaining to said requests, and communicating the aggregated data corresponding to said requests to said one OLAP server that communicated said requests.

2. The stand-alone data aggregation server of claim 1, wherein the plurality of different OLAP servers comprise a plurality of different OLAP servers distributed by different vendors.

3. The stand-alone data aggregation server of claim 1, wherein the interface implements a standard protocol for accessing data.

4. The stand-alone data aggregation server of claim 3, wherein the standard protocol comprises one of OLDB, OLE-DB, ODBC, SQL, and JDBC.

5. The stand-alone data aggregation server of claim 1, wherein computational tasks performed by the aggregation engine is restricted to data aggregation operations.

6. The stand-alone data aggregation server of claim 1, wherein said interface extracts dimensions from the received requests and forwards the dimensions to a storage management module, and wherein the storage management module accesses locations of the multidimensional datastore based upon the forwarded dimensions and returns the retrieved data back to the interface for communication to the one OLAP server that communicated said requests.

7. The stand-alone data aggregation server of claim 1, further comprising control logic that, upon determining that multidimensional datastore does not contain aggregated data required to service at least one given request, controls the aggregation engine to perform aggregation operations to thereby generate the required aggregated data and return the required aggregated data back to the interface for communication to said one OLAP server that communicated said requests.

8. The stand-alone data aggregation server of claim 7, wherein the control logic controls a storage management module to store the required aggregation data generated by the aggregation engine in the multidimensional database.

9. The stand-alone data aggregation server of claim 1, wherein data stored in the multidimensional datastore is logically partitioned into N dimensions, wherein the aggregation engine performs a first stage of aggregation operations along a first dimension, and performs and second stage of aggregation operations for a given slice in the first dimension along N−1 dimensions other than the first dimension.

10. The stand-alone data aggregation server of claim 9, wherein the aggregation engine stores the resultant data of aggregration operations for the given slice as a record in a data file, wherein location of the record in the data file is stored in a directory.

11. The stand-alone data aggregation server of claim 10, wherein the directory stores, for a given record, a start address and end address of the record and a physical address of the data file.

12. The stand-alone data aggregation server of claim 1, wherein time delay in responding to said requests is equivalent to accessing a local datastore of the one OLAP server.

13. An on-line analytical processing (OLAP) system comprising:

a plurality of client machines communicating with an OLAP server over a network;

the OLAP server including OLAP analysis logic and presentation logic to enable user-directed OLAP analysis on data; and the stand-alone aggregation server of claim 1 that operably communicates with the OLAP server to perform data aggregation operations on the data, and store and manage such data for access by the OLAP server.

14. The OLAP system of claim 13, wherein the network includes the infrastructure of the Internet.

15. The OLAP system of claim 14, wherein said client machines include a web-browser-based user interface that enables said user-directed OLAP analysis.

16. A decision support system operable within an enterprise, the system comprising:

a plurality of client machines communicating with a first server over a network;

the first server including support for user-directed analysis of data; and the stand-alone aggregation server of claim 1 that operably communicates with the first server to perform data aggregation operations on the data, and store and manage such data for access by the first server.

17. The decision support system of claim 16, wherein the network includes the infrastructure of the Internet.

18. The decision support system of claim 17, wherein said client machines include a web-browser-based user interface that enables said user-directed analysis.

* * * * *

UNITED STATES PATENT AND TRADEMARK OFFICE
CERTIFICATE OF CORRECTION

| | |
|---|---|
| PATENT NO. | : 6,434,544 B1 |
| APPLICATION NO. | : 09/514611 |
| DATED | : August 13, 2002 |
| INVENTOR(S) | : Reuven Bakalash, Guy Shaked and Joseph Caspi |

It is certified that error appears in the above-identified patent and that said Letters Patent is hereby corrected as shown below:

On the Title Pg Item (56) The References Cited should include:

| | |
|---|---|
| 6,212,524 B1 | * 04/2001 Weissman et al. ......707/101 |
| 6,189,004 B1 | * 02/2001 Rassen et al. .........707/3 |
| 6,163,774 | * 12/2000 Lore et al. ............707/2 |
| 6,141,655 | * 10/2000 Johnson et al. .........707/2 |
| 6,134,541 | * 10/2000 Castelli et al. .........707/2 |
| 6,122,628 | * 09/2000 Castelli et al. .........707/5 |
| 6,108,647 | * 08/2000 Poosala et al. .........707/1 |
| 6,023,695 | * 02/2000 Osborn et al. ..........707/3 |
| 6,006,216 | * 12/1999 Griffin et al. ..........707/2 |
| 6,003,029 | * 12/1999 Agrawal et al. ..........707/7 |
| 5,999,192 | * 12/1999 Selfridge et al. ........345/440 |
| 5,991,754 | * 11/1999 Raitto et al. ............707/2 |
| 5,987,467 | * 11/1999 Ross et al. .............707/100 |
| 5,978,796 | * 11/1999 Malloy et al. ..........707/3 |
| 5,978,788 | * 11/1999 Castelli et al. ..........707/2 |
| 5,963,936 | * 10/1999 Cochrane et al. .......707/3 |
| 5,940,822 | * 08/1999 Haderie et al. .........707/3 |
| 5,926,820 | * 07/1999 Agrawal et al. ..........707/200 |
| 5,918,225 | * 06/1999 White et al. ............707/3 |
| 5,905,985 | * 05/1999 Malloy et al. ..........707/100 |
| 5,890,151 | * 03/1999 Agrawal et al. .........707/5 |
| 5,864,857 | * 01/1999 Ohata et al. ...........707/100 |
| 5,852,821 | * 12/1998 Chen et al. .............707/2 |
| 5,850,547 | * 12/1998 Waddington et al. ......709/102 |
| 5,832,475 | * 11/1998 Agrawal et al. .........707/2 |
| 5,805,885 | * 09/1998 Leach et al. .............709/316 |
| 5,799,300 | * 08/1998 Agrawal et al. ..........707/5 |
| 5,794,229 | * 08/1998 French et al. ............707/2 |
| 5,794,228 | * 08/1998 French et al. ............707/2 |
| 5,781,896 | * 07/1998 Dalal .....................707/2 |
| 5,765,028 | * 06/1998 Gladden .................706/25 |
| 5,745,764 | * 04/1998 Leach et al. ............709/316 |
| 5,706,495 | * 01/1998 Chadha et al. ...........707/2 |
| 5,379,419 | * 01/1995 Heffernan et al. ........707/4 |
| 5,257,365 | * 10/1993 Powers et al. ............707/100 |

UNITED STATES PATENT AND TRADEMARK OFFICE
CERTIFICATE OF CORRECTION

PATENT NO. : 6,434,544 B1
APPLICATION NO. : 09/514611
DATED : August 13, 2002
INVENTOR(S) : Reuven Bakalash, Guy Shaked and Joseph Caspi It is certified that error appears in the above-identified patent and that said Letters Patent is hereby corrected as shown below:

On the Title Pg Item (56) The Other Publications should include:

SAS/MDDB® Server, "See Data From All Angles With Multidimensional Database Software" available from www.sas.com/products/mddb/index.html, 2001.

Korn et al., "Efficiently Supporting Ad Hoc Queries In Large Datasets Of Time Sequences" Proceedings of 1997 ACM SIGMOD International Conference on Management of Data, May 1997, pp. 289-300.

Cheung et al., "Towards The Building Of A Dense-Region-Based OLAP System", Data and Knowledge Engineering, Vol. 36, Nov. 1, 2001, pp 1-27.

Salem et al., "How To Roll A Join: Asynchronous Incremental View Maintenance", Proceedings of 2000 ACM SIGMOD International Conference on Management of Data, May 2000, pp. 129-140.

Pourabbas et al., "Hierarchies And Relative Operators In The OLAP Environment" SIGMOD RECORD, Vol. 29, No. 1, March 2000, pp. 32-37.

Pedersen, "Aspects Of Data Modeling And Query Processing For Complex Multidimensional Data", Abstract and Chapter 4, Dept. Computer Sci., Aalborg Univ., Denmark, pp. 1, 77-103.

Pourabbas et al., "Characterization Of Hierarchies And Some Operators In OLAP Environment", ACM 2nd International Workshop on Data Warehousing & OLAP, 1999, pp. 54-59.

Elkins, "Open OLAP", DBMS Online, April 1998, pp. 1-7.

Widman et al., "Efficient Execution Of Operations In A DBMS For Multidimensional Arrays", 10th Intl Conf on Scientific and Statistical Database Management, 1998, pp. 155-165.

UNITED STATES PATENT AND TRADEMARK OFFICE
CERTIFICATE OF CORRECTION

PATENT NO. : 6,434,544 B1
APPLICATION NO. : 09/514611
DATED : August 13, 2002
INVENTOR(S) : Reuven Bakalash, Guy Shaked and Joseph Caspi It is certified that error appears in the above-identified patent and that said Letters Patent is hereby corrected as shown below:

On the Title Pg Item (56) The Other Publications should include:

Hellerstein et al., "Online Aggregation", Proceedings of 1997 ACM SIGMOD International Conference on Management of Data, May 1997, pp. 171-182.

Ho et al., "Range Queries In OLAP Data Cubes", Proceedings of 1997 ACM SIGMOD International Conference on Management of Data, May 1997, pp. 73-88.

Agrawal et al. "Modeling Multidimensional Databases" Expanded Version, Proc. of 13th International Conference on Data Engineering, 1997, pp. 1-12.

Li et al., "A Data Model For Supporting On-Line Analytical Processing", Proceedings of International Conference on Information & Knowledge Management, 1996, pp. 81-88.

Agarwal et al., "On The Computation Of Multidimensional Aggregates", 22nd International Conference On Very Large Databases, 1996, pp. 1-16.

McKie, "Essbase 4.0", DBMS Online, July 1996, pp. 1-4.

Li et al., "Optimizing Statistical Queries By Exploiting Orthogonality And Interval Properties Of Grouping Relations", 8th International Conference on Scientific & Statistical Database Management, 1996, pp. 1-10.

Signed and Sealed this

Tenth Day of November, 2009

David J. Kappos
*Director of the United States Patent and Trademark Office*